(12) United States Patent
Fujiyama et al.

(10) Patent No.: US 12,349,033 B2
(45) Date of Patent: *Jul. 1, 2025

(54) VEHICLE WIRELESS COMMUNICATION SYSTEM, CONTROL DEVICE, AND INFORMATION OUTPUT METHOD

(71) Applicant: PANASONIC INTELLECTUAL PROPERTY MANAGEMENT CO., LTD., Osaka (JP)

(72) Inventors: Jun Fujiyama, Kanagawa (JP); Naoya Koike, Saitama (JP); Jun Ogawa, Kanagawa (JP); Shinya Ota, Kanagawa (JP)

(73) Assignee: Panasonic Automotive Systems Co., Ltd., Yokohama (JP)

( * ) Notice: Subject to any disclaimer, the term of this patent is extended or adjusted under 35 U.S.C. 154(b) by 84 days.

This patent is subject to a terminal disclaimer.

(21) Appl. No.: 18/307,649

(22) Filed: Apr. 26, 2023

(65) Prior Publication Data

US 2023/0262437 A1    Aug. 17, 2023

Related U.S. Application Data

(63) Continuation of application No. 17/466,980, filed on Sep. 3, 2021, now Pat. No. 11,671,810, which is a (Continued)

(30) Foreign Application Priority Data

Mar. 13, 2019    (JP) ................................. 2019-045809

(51) Int. Cl.
*H04W 4/80*    (2018.01)
*H04W 4/00*    (2018.01)
(Continued)

(52) U.S. Cl.
CPC ............... *H04W 4/80* (2018.02); *H04W 4/00* (2013.01); *H04W 4/44* (2018.02); *B60R 25/102* (2013.01); *B60R 25/245* (2013.01)

(58) Field of Classification Search
CPC ........... H04W 4/00; H04W 4/44; H04W 4/80; G08B 13/14; G08B 13/1427; G08B 21/24;
(Continued)

(56) References Cited

U.S. PATENT DOCUMENTS 9,919,681 B2 *  3/2018  Watanabe ............. B60R 25/209
9,950,692 B2 *  4/2018  Watanabe ............. B60R 25/245
(Continued)

FOREIGN PATENT DOCUMENTS

CN    103253232 A    8/2013
CN    104637125 A    5/2015
(Continued)

OTHER PUBLICATIONS

Chinese Office Action, dated Jun. 15, 2022, for Chinese Application No. 201980093909.7, 20 pages. (with English translation).
(Continued)

*Primary Examiner* — Van T Trieu
(74) *Attorney, Agent, or Firm* — Seed IP Law Group LLP

(57) ABSTRACT

A vehicle wireless communication system includes: a vehicle including an output circuit; and first and second communication devices configured to wirelessly communicate with the vehicle. In a case in which the first communication device is positioned in a first area including one point located inside the vehicle, the use of the vehicle is permitted. In a case in which the first communication device is positioned in a second area including the one point and the second communication device is not positioned in a third area including the one point, the output circuit outputs a notification that there is a possibility of failure to carry the
(Continued)

second communication device. In a case in which the first communication device is positioned in the second area and the second communication device is positioned in the third area, the output circuit of the vehicle does not output the notification.

20 Claims, 30 Drawing Sheets

Related U.S. Application Data continuation of application No. PCT/JP2019/049969, filed on Dec. 19, 2019.

(51) Int. Cl.
  *H04W 4/44* (2018.01)
  *B60R 25/102* (2013.01)
  *B60R 25/24* (2013.01)

(58) Field of Classification Search
  CPC ......... G05B 23/00; G01S 13/74; B60R 25/01; B60R 25/04; B60R 25/102; B60R 25/20; B60R 25/209; B60R 25/24; B60R 25/241; B60R 25/245
  See application file for complete search history.

(56) References Cited

U.S. PATENT DOCUMENTS

| | | | |
|---|---|---|---|
| 10,894,664 | B1 | 1/2021 | Brady et al. |
| 2005/0105414 | A1 | 5/2005 | Nagara et al. |
| 2005/0128076 | A1 | 6/2005 | Shinada et al. |
| 2005/0195072 | A1 | 9/2005 | Yamazaki |
| 2008/0030327 | A1 | 2/2008 | Yoshizawa |
| 2019/0028955 | A1 | 1/2019 | Ochiai |
| 2019/0329787 | A1 | 10/2019 | Hayashi |

FOREIGN PATENT DOCUMENTS

| | | | |
|---|---|---|---|
| JP | 2005128729 | A | 5/2005 |
| JP | 2005247132 | A | 9/2005 |
| JP | 2007048248 | A | 2/2007 |
| JP | 2010055362 | A | 3/2010 |
| JP | 2012173902 | A | 9/2012 |
| JP | 2016168954 | A | 9/2016 |
| JP | 2018136921 | A | 8/2018 |

OTHER PUBLICATIONS

Examiner's Search Strategy and Results, Jan. 17, 2023, 10 pages.
International Search Report dated Jan. 28, 2020, for the corresponding International Patent Application No. PCT/JP2019/049969, 6 pages. (with English translation).
International Written Opinion of the International Search Authority dated Jan. 28, 2020, for the corresponding International Patent Application No. PCT/JP2019/049969, 4 pages.
Japanese Office Action, issued Sep. 20, 2022, for Japanese Patent Application No. 2021-505530. (5 pages) (with English Translation).

* cited by examiner (CONT.)

VEHICLE WIRELESS COMMUNICATION SYSTEM, CONTROL DEVICE, AND INFORMATION OUTPUT METHOD

CROSS-REFERENCE TO RELATED APPLICATIONS

This application is a continuation of U.S. patent application Ser. No. 17/466,980 filed Sep. 3, 2021, now U.S. Pat. No. 11,671,810, which is a continuation of PCT International Patent Application No. PCT/JP2019/049969 filed on Dec. 19, 2019, which claims the benefit of priority of Japanese Patent Application No. 2019-045809 filed on Mar. 13, 2019, the entire contents of which are incorporated herein by reference.

FIELD

The present disclosure relates to a vehicle wireless communication system, a control device, and an information output method that are suitable for use in a vehicle such as a motorcycle or an automobile.

BACKGROUND

In a related art, there is a technology of outputting a notification in response to a detection of failure to carry a pre-registered carry-on item using an IC tag. For example, an article carrying failure prevention device disclosed in JP-A-2007-048248 includes a detection unit that detects approach or movement of a person, a reading unit that reads article information from a wireless communication terminal device including a memory unit that stores the article information, a storage unit that stores carry-on item data, and a notification unit that compares the article information read from the wireless communication terminal device with the carry-on item data stored in the storage unit and outputs a notification of a comparison result.

SUMMARY

When a plurality of users use the vehicle in a vehicle wireless communication system including an ECU mounted on a vehicle and an electronic key used in the vehicle, since the technique described in JP-A-2007-048248 described above can not identify who is on board, it is not possible to determine which carry-on item is a target of the notification when it is not carried. For example, the system may be configured to register a plurality of smartphones as carry-on items and output the notification when all of the plurality of smartphones are not available, but the notification will occur even when one person is on board.

That is, as shown in FIG. 30, in a case in which two smartphones SH1 and SH2 are registered as carry-on item data and one user Y1 carries the smartphone SH1 and gets on a vehicle 200, the smartphone SH1 is detected, but the smartphone SH2 is not detected. Consequently, even though there is no user carrying the smartphone SH2, the notification of the failure to carry the smartphone SH2 is output.

As shown in FIG. 31, in a case in which the smartphone SH1 or the smartphone SH2 is registered as carry-on item data and one user Y2 fails to carry the smartphone SH2 and gets on the vehicle 200, the smartphone SH1 is detected, so that the notification of the failure to carry the smartphone SH2 is not output.

An object of the present disclosure is to provide a vehicle wireless communication system, a control device, and an information output method capable of preventing a failure to carry a pre-registered carry-on item for carry-on items carried by all persons on a vehicle.

A vehicle wireless communication system according to the present disclosure includes: a vehicle including an output circuit; a first communication device configured to wirelessly communicate with the vehicle; and a second communication device configured to wirelessly communicate with the vehicle, in which in a case in which the first communication device is positioned in a first area including one point located inside the vehicle, the user of the vehicle is permitted, in a case in which the first communication device is positioned in a second area including the one point located inside the vehicle and the second communication device is not positioned in a third area including the one point located inside the vehicle, the output circuit of the vehicle outputs a notification that there is a possibility of a failure to carry the second communication device, and in a case in which the first communication device is positioned in the second area and the second communication device is positioned in the third area, the output circuit of the vehicle does not output the notification that there is a possibility of a failure to carry the second communication device.

A vehicle wireless communication system includes: a control device that includes an output circuit and is mountable on a vehicle; a first communication device configured to wirelessly communicate with the control device; and a second communication device configured to wirelessly communicate with the control device, in which in a case in which the first communication device is positioned in a first area including one point located inside the vehicle, the use of the vehicle is permitted, in a case in which the first communication device is positioned in a second area including the one point located inside the vehicle and the second communication device is not positioned in a third area including the one point located inside the vehicle, the output circuit of the control device outputs a notification that there is a possibility of a failure to carry the second communication device, and in a case in which the first communication device is positioned in the second area and the second communication device enters the third area, the output circuit of the control device does not output the notification that there is a possibility of a failure to carry the second communication device.

A control device according to the present disclosure includes: an output circuit, the control device being mountable on a vehicle, the control device being configured to wirelessly communicate with a first communication device, and the control device being configured to wirelessly communicate with a second communication device, in which in a case in which the first communication device is positioned in a first area including one point located inside the vehicle, the control device controls the vehicle to permit the use of the vehicle, in a case in which the first communication device is positioned in a second area including the one point located inside the vehicle and the second communication device is not positioned in a third area including the one point located inside the vehicle, the output circuit of the control device outputs a notification that there is a possibility of a failure to carry the second communication device, and in a case in which the first communication device is positioned in the second area and the second communication device is positioned in the third area, the output circuit of the control device does not output the notification that there is a possibility of a failure to carry the second communication device.

An information output method according to the present disclosure is usable for an output circuit of a vehicle wireless communication system, the vehicle wireless communication system including: a vehicle including an output circuit; a first communication device configured to wirelessly communicate with the vehicle; and a second communication device configured to wirelessly communicate with the vehicle, in which in a case in which the first communication device is positioned in a first area including located one point located inside the vehicle, the use of the vehicle is permitted, the information output method includes: causing the output circuit of the vehicle to output a notification that there is a possibility of a failure to carry the second communication device in a case in which the first communication device is positioned in a second area including the one point located inside the vehicle and the second communication device is not positioned in a third area including the one point located inside the vehicle; and causing the output circuit of the vehicle not to output the notification that there is a possibility of a failure to carry the second communication device.

BRIEF DESCRIPTION OF DRAWINGS

FIGS. 28A and 28B are a flowchart showing an operation of the ECU in the vehicle wireless communication system according to the fourth embodiment, in a case in which a determination of a failure to carry a carry-on item is performed when power supply of the vehicle is ON.

DETAILED DESCRIPTION

Hereinafter, embodiments in which an electronic key system and a vehicle wireless communication system according to the present disclosure (hereinafter, referred to as "the present embodiment") are specifically disclosed will be described in detail with reference to the drawings as appropriate. However, unnecessarily detailed description may be omitted. For example, a detailed description of a well-known matter or a repeated description of substantially the same configuration may be omitted. This is to avoid unnecessary redundancy in the following description and to facilitate understanding of those skilled in the art. It should be noted that the accompanying drawings and the following description are provided for a thorough understanding of the present disclosure by those skilled in the art, and are not intended to limit the subject matter recited in the claims.

Hereinafter, preferred present embodiments for carrying out the present disclosure will be described in detail with reference to the drawings.

First Embodiment

Figure 1:
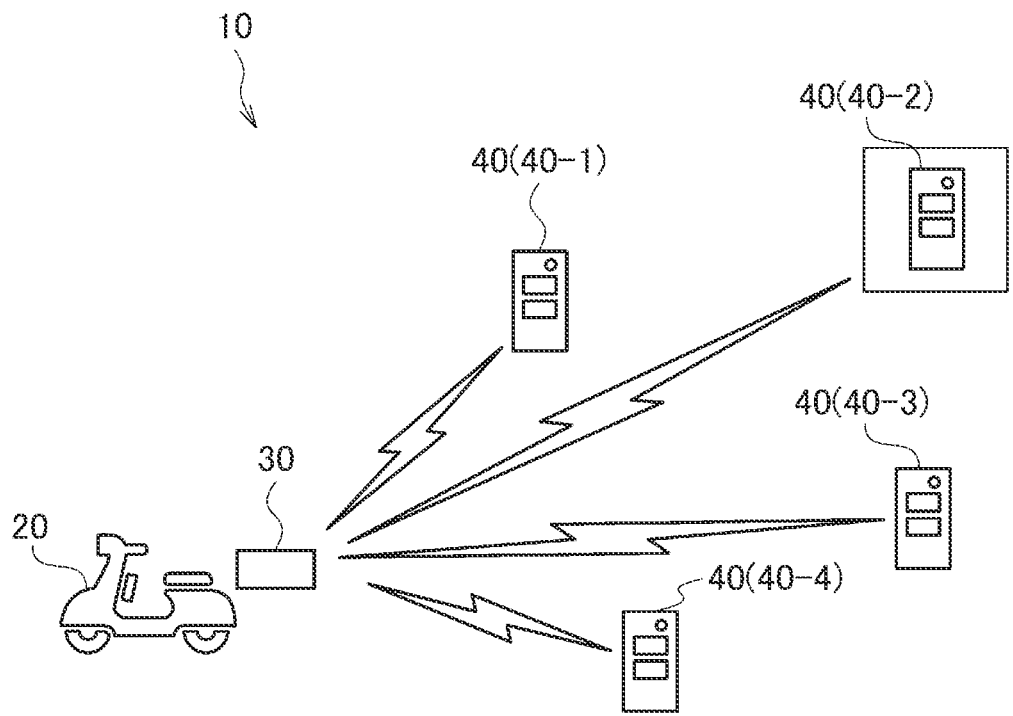
FIG. 1 is a diagram showing a schematic configuration of an electronic key system according to a first embodiment.

Hereinafter, the electronic key system according to a first embodiment will be described with reference to FIGS. 1-5, 6A, 6B and 7. FIG. 1 is a diagram showing a schematic configuration of an electronic key system 10 according to the first embodiment. In the figure, the electronic key system 10 according to the first embodiment is applied to a two-wheeled vehicle 20, and includes an ECU (control device) 30 mounted on the vehicle 20 and an electronic key 40 carried by a user of the vehicle 20. In FIG. 1, four electronic keys 40 exist within a communication range of the ECU 30, and "−1 to −4" are given to the reference sign 40 so that the four electronic keys 40 can be distinguished from each other.

For example, Bluetooth (registered trademark) LE is used for communication between the ECU 30 and each of the electronic keys 40-1 to 40-4. A frequency used in the Bluetooth LE is about 2.4 GHz, and a communication distance is about 100 m. The ECU 30 performs two-way communication with all the electronic keys 40-1 to 40-4 that exist in the communication range, and enables use of the vehicle 20 when a distance between at least one of all the electronic keys 40-1 to 40-4 and the vehicle 20 is smaller than a predetermined value (that is, less than the predetermined value). That is, the vehicle 20 can be used.

The ECU 30 checks battery voltages of all the electronic keys 40-1 to 40-4 that exist in the communication range, and if any of the electronic keys 40-1 to 40-4 has a voltage lower than a predetermined voltage, the ECU 30 lights or blinks a warning lamp 502 (display unit, see FIG. 2) included in a meter 50 (see FIG. 2) disposed on an instrument panel (not shown) of the vehicle 20, and further blinks a light emitting diode (LED, see FIG. 3) 405 provided on a key body of the electronic keys 40-1 to 40-4 having a voltage lower than a predetermined voltage. In FIG. 1, a battery voltage of the electronic key 40-2 drops, and the LED 405 provided on a key body of the electronic key 40-2 blinks. Details of an operation related to detection and notification of a battery voltage drop of each of the electronic keys 40-1 to 40-4 will be described below.

Figure 2:
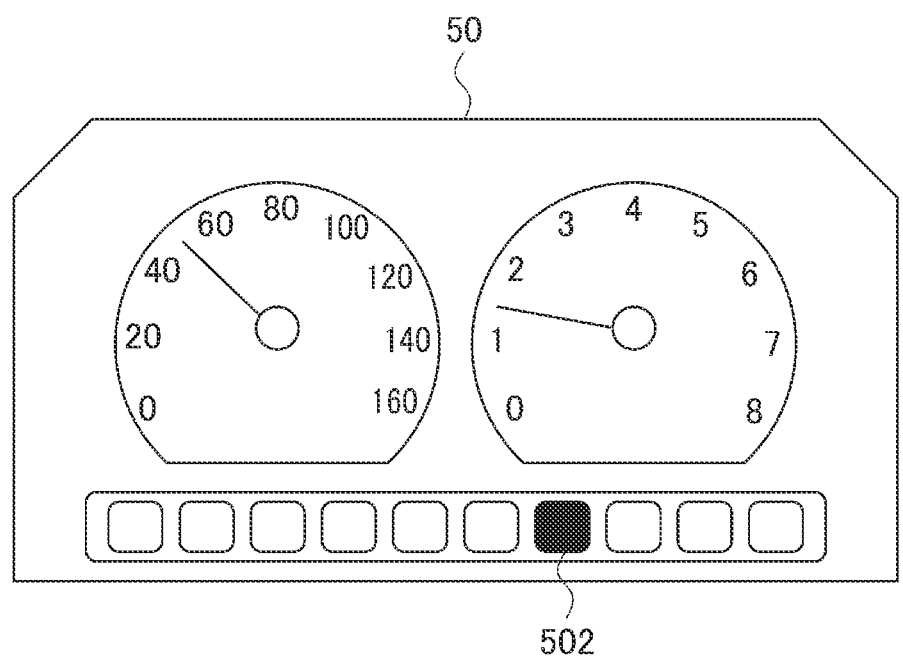
FIG. 2 is a front view showing an appearance of a meter included the electronic key system according to the first embodiment.
Figure 3:
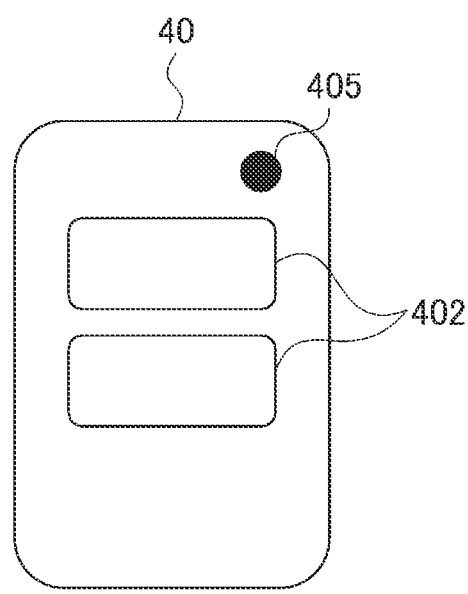
FIG. 3 is a plan view showing the appearance of the meter included the electronic key system according to the first embodiment.

FIG. 2 is a front view showing an appearance of the meter 50 disposed in the instrument panel (not shown) of the vehicle 20. As shown in the figure, the meter 50 is provided with the warning lamp 502. FIG. 3 is a plan view showing an appearance of the electronic key 40. As shown in the figure, the electronic key 40 is provided with key switches 402 and the LED 405.

Figure 4:
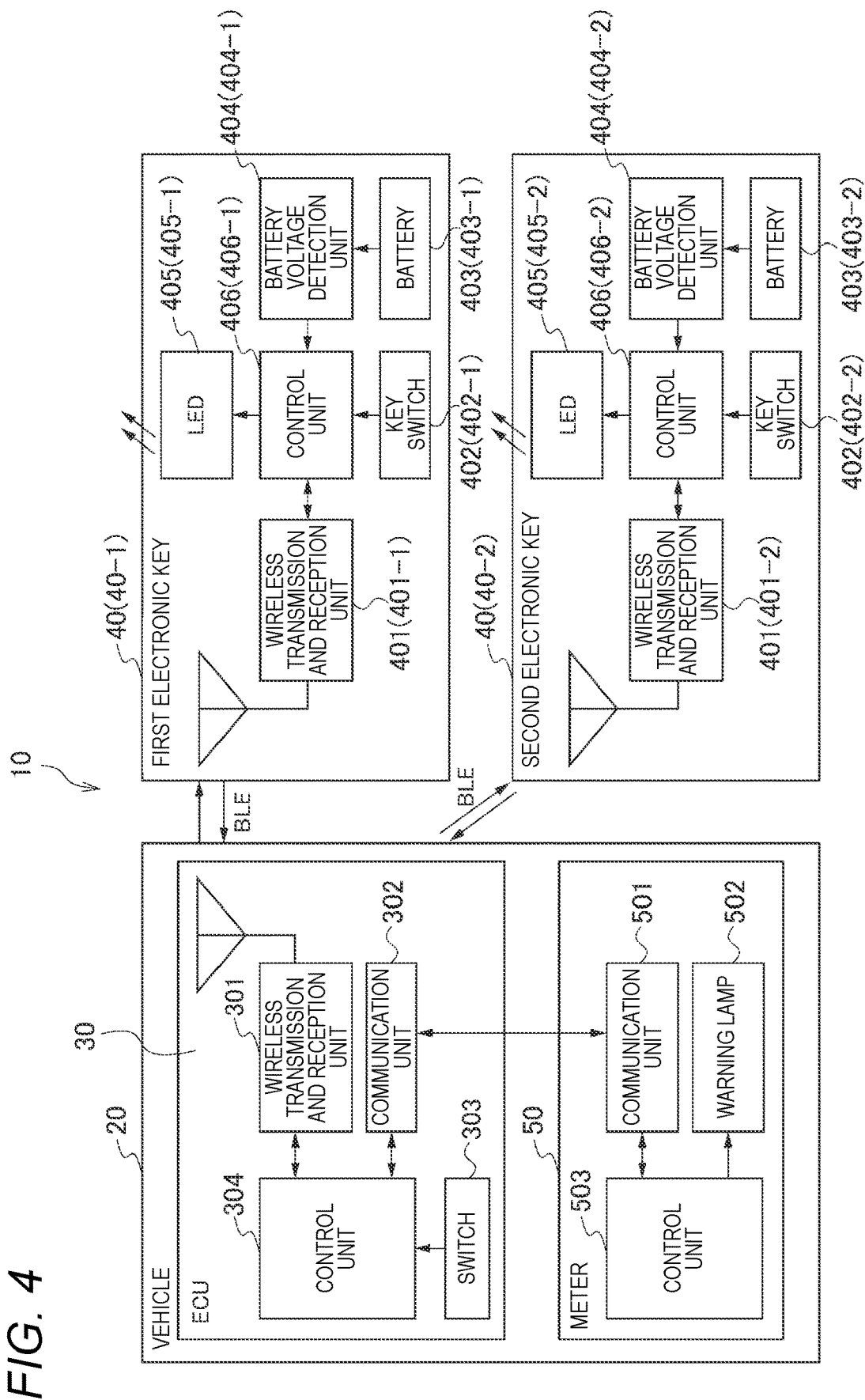
FIG. 4 is a block diagram showing a schematic configuration of each of an ECU, the meter, and an electronic key of a vehicle included in the electronic key system according to the first embodiment.

FIG. 4 is a block diagram showing a schematic configuration of each of the ECU 30, the meter 50, and the electronic key 40 of the vehicle 20 included in the electronic key system 10 according to the first embodiment. In FIG. 4, two electronic keys 40 exist within the communication range of the ECU 30, and reference signs 40-1 and 40-2 are assigned to distinguish the two electronic keys 40 from each other. However, in the present specification, when the two electronic keys 40 are described separately, they are described as a first electronic key 40-1 and a second electronic key 40-2, and the others are simply described as the electronic key 40.

In FIG. 4, in addition to the ECU 30 described above, the meter 50 is mounted on the vehicle 20. The ECU 30 includes a wireless transmission and reception unit 301 that performs two-way communication with the electronic key 40 using the Bluetooth LE, a communication unit 302 that performs communication with the meter 50 of the vehicle 20 by wire, a switch 303 that turns on or off power supply of the vehicle 20, and a control unit 304 that controls the wireless transmission and reception unit 301 and the communication unit 302, and receives an ON or OFF signal output from the switch 303. In the present embodiment, an ignition switch is used as the switch 303. The control unit 304 includes a central processing unit (CPU) (not shown), a read only memory (ROM) storing a program for controlling the CPU, and a random access memory (RAM) used for an operation of the CPU, and controls the detection and notification of the battery voltage drop of the electronic key 40 as a part of the control.

The meter 50 includes a communication unit 501 that performs communication with the communication unit 302 of the ECU 30 by wire, the warning lamp 502 that outputs a notification of the battery voltage drop of the electronic key 40, and a control unit 503 that controls the communication unit 501 and causes the warning lamp 502 to blink by receiving an electronic key battery voltage drop warning lamp blinking instruction from the ECU 30. Similar to the control unit 304 of the ECU 30, the control unit 503 includes a CPU (not shown), a ROM storing a program for controlling the CPU, and a RAM used for an operation of the CPU. An LED, for example, is used as the warning lamp 502.

The first electronic key 40-1 and the second electronic key 40-2 are the same, and include a wireless transmission and reception unit 401, the key switch 402, a battery 403, a battery voltage detection unit 404, the LED 405, and a control unit 406. Here, since the first electronic key 40-1 and the second electronic key 40-2 include the same elements, when distinguishing each element for description, in the first electronic key 40-1, a wireless transmission and reception unit 401-1, a key switch 402-1, a battery (first battery) 403-1, a battery voltage detection unit 404-1, an LED (first display) 405-1, and a control unit 406-1 are described, and in the second electronic key 40-2, a wireless transmission and reception unit 401-2, a key switch 402-2, a battery (second battery) 403-2, a battery voltage detection unit 404-2, an LED (second display) 405-2, and a control unit 406-2 are described.

Each of the battery (first battery) 403-1 of the first electronic key 40-1 and the battery (second battery) 403-2 of the second electronic key 40-2 is a primary battery and is replaceable. Instead of the LED 405-1 of the first electronic key 40-1 and the LED 405-2 of the second electronic key 40-2, a display unit equipped with a display capable of displaying characters such as a liquid crystal display may be used. By using the display unit, it is possible to present more information related to the battery voltage drop of the electronic key 40. By using an LED as the first display of the first electronic key 40-1 and an LED as the second display of the second electronic key 40-2, good visibility can be obtained and miniaturization of the first electronic key and the second electronic key is contributed.

In a case in which a distance between the vehicle 20 and at least one electronic key of the first electronic key 40-1 and the second electronic key 40-2 is smaller than a predetermined value, the use of the vehicle 20 is permitted.

The first electronic key 40-1 is capable of wireless communication with the ECU 30 of the vehicle 20 by the Bluetooth LE by the wireless transmission and reception unit 401-1. The control unit 406-1 of the first electronic key 40-1 notifies the vehicle 20 of first information corresponding to the battery voltage of the battery 403-1 by the wireless communication using the Bluetooth LE. After the control unit 406-1 of the first electronic key 40-1 notifies the vehicle 20 of the first information, in a case in which the control unit 406-1 receives an instruction to display the battery voltage drop from the vehicle 20, the control unit 406-1 blinks the LED 405-1. In this case, the LED 405-1 may be lit. However, by blinking, it is possible to draw more attention, to output surely notification that the battery voltage drops, and to reduce current consumption of the electronic key. Alternatively, the battery voltage drop may be displayed by changing a color or luminance of the LED 405-1.

Similarly to the first electronic key 40-1, the second electronic key 40-2 is capable of wireless communication with the ECU 30 of the vehicle 20 by the Bluetooth LE by the wireless transmission and reception unit 401-2. The control unit 406-2 of the second electronic key 40-2 notifies the vehicle 20 of second information corresponding to the battery voltage of the battery 403-2 by the wireless communication using the Bluetooth LE. After the control unit 406-2 of the second electronic key 40-2 notifies the vehicle 20 of the second information, in response to reception of an instruction to display the battery voltage drop from the vehicle 20, the control unit 406-2 blinks the LED 405-2. In this case, the LED 405-2 may be lit.

Thus, the electronic key 40 detects a voltage of an own battery and notifies the vehicle of a result, and after giving this notification, the electronic key 40 blinks the own LED 405 in response to reception of an instruction to display a battery voltage drop from the vehicle 20. A user carrying the electronic key 40 can recognize that the battery voltage of the electronic key 40 drops by checking the blinking of the LED 405.

Next, an operation of detection and notification of the battery voltage drop in the ECU and the electronic key 40 of the vehicle 20 will be described in detail. The control unit 304 of the ECU 30 recognizes a first voltage value of the first battery 403-1 of the first electronic key 40-1 by the first information corresponding to a voltage of the first battery 403-1 from the first electronic key 40-1. The control unit 304 recognizes a second voltage value of the second battery 403-2 of the second electronic key 40-2 by the second information corresponding to a voltage of the second battery 403-2 from the second electronic key 40-2.

In response to operation of the switch 303, the control unit 304 of the ECU 30 blinks the warning lamp 502 of the meter 50 of the vehicle 20 in a case in which the first voltage value of the first battery 403-1 of the first electronic key 40-1 is smaller than a first predetermined value (that is, less than the first predetermined value) and the second voltage value of the second battery 403-2 of the second electronic key 40-2 is not smaller than a second predetermined value (that is, equal to or higher than the second predetermined value). The control unit 304 of the ECU 30 outputs an instruction to display a battery voltage drop to the first electronic key 40-1, and does not output an instruction to display a battery voltage drop to the second electronic key 40-2. Accordingly, the LED 405-1 of the first electronic key 40-1 blinks, and the LED 405-2 of the second electronic key 40-2 does not blink.

The first predetermined value to be compared with the first voltage value of the first battery 403-1 of the first electronic key 40-1 and the second predetermined value to be compared with the second voltage value of the second battery 403-2 of the second electronic key 40-2 may be the same value or different values. By setting the first predetermined value and the second predetermined value to the same value, it is possible to simultaneously set two values only by inputting one value.

A period for which the warning lamp 502 of the meter 50 is lit or blinks in response to the battery voltage drop of the electronic key 40 and a period for which the LED 405 blinks in response to the instruction to display the battery voltage drop to the electronic key 40 of which the battery voltage drops may be the same period, or at least a part thereof may overlap. A timing at which the warning lamp 502 starts to light or blink and a timing at which the LED 405 starts to blink may be made to coincide with each other or may be different from each other.

Figure 5:
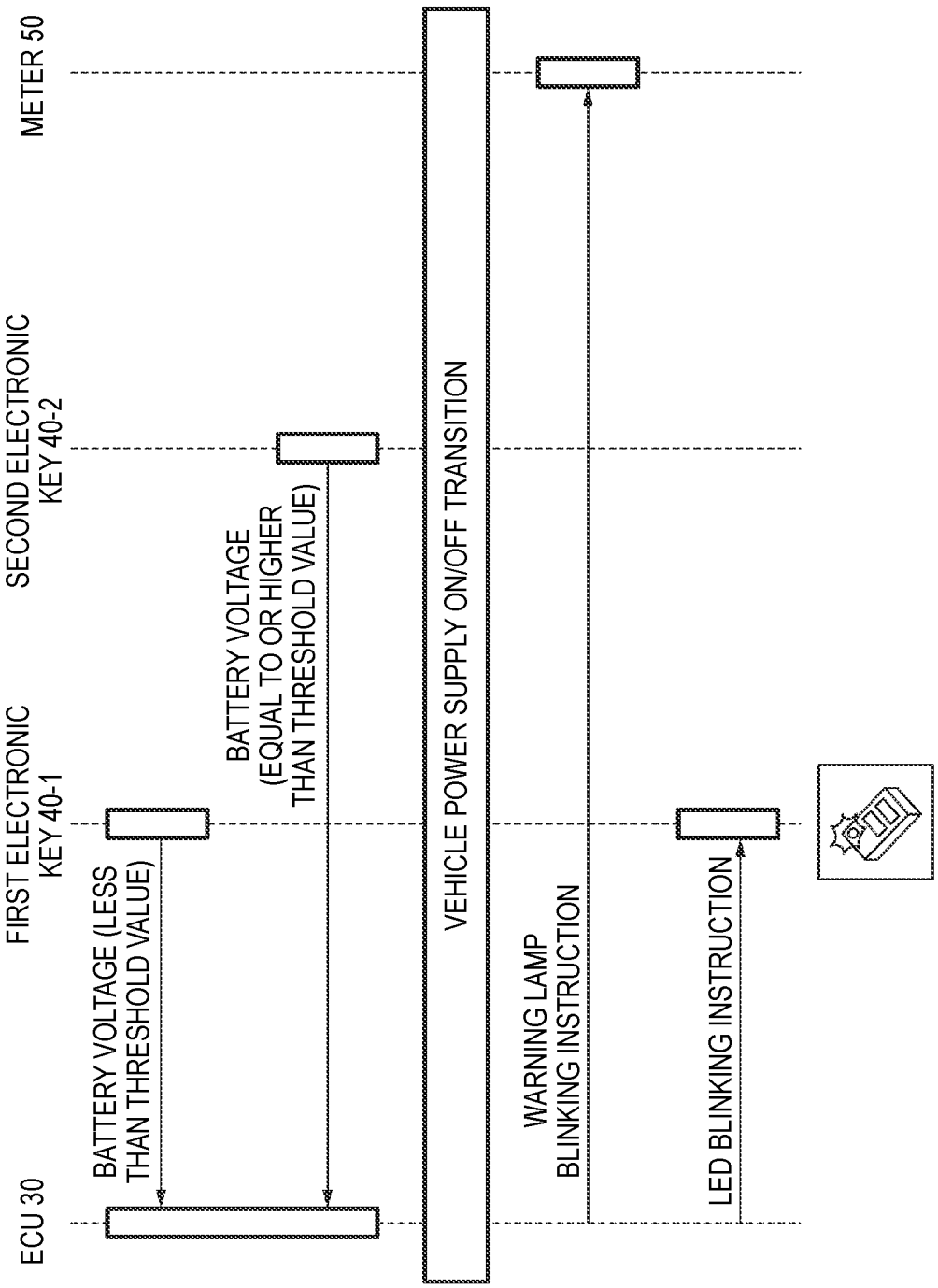
FIG. 5 is a sequence diagram showing an operation of detection and notification of a battery voltage drop in the ECU, the electronic key, and the meter of the electronic key system according to the first embodiment.

FIG. 5 is a sequence diagram showing an operation of detection and notification of a battery voltage drop in the ECU 30, the first electronic key 40-1, the second electronic key 40-2, and the meter 50 of the vehicle 20. An example in the figure shows a case where the battery voltage of the first electronic key 40-1 drops and the battery voltage of the second electronic key 40-2 does not drop.

In FIG. 5, the first electronic key 40-1 and the second electronic key 40-2 each transmit information related to the battery voltage in a predetermined cycle. That is, the first information indicating the first voltage value is transmitted from the first electronic key 40-1 in a predetermined cycle, and the second information indicating the second voltage value is transmitted from the second electronic key 40-2 in a predetermined cycle. The ECU 30 receives information on the battery voltage transmitted from each of the first electronic key 40-1 and the second electronic key 40-2, and detects a battery voltage drop. Here, since it is assumed that the battery voltage of the first electronic key 40-1 drops, the ECU 30 detects a drop in the battery voltage of the first electronic key 40-1 from the first information transmitted from the first electronic key 40-1. Thus, the ECU 30 receives the information on the battery voltage transmitted from each of the first electronic key 40-1 and the second electronic key 40-2 in a predetermined cycle, and detects a battery voltage drop of the first electronic key 40-1 and the second electronic key 40-2.

Then, in a case in which the switch 303 is operated in this state and the power supply of the vehicle 20 transitions from ON to OFF or from OFF to ON, the ECU 30 transmits an electronic key battery voltage drop warning lamp blinking instruction to the meter 50. In addition, the ECU 30 transmits an instruction to display a battery voltage drop (an LED blinking instruction) to the first electronic key 40-1. The control unit 503 of the meter 50 lights or blinks the warning lamp 502 by receiving the electronic key battery voltage drop warning lamp blinking instruction transmitted from the ECU 30. The control unit 406-1 of the first electronic key 40-1 blinks the LED 405-1 by receiving an instruction to display the battery voltage drop transmitted from the ECU 30.

Figure 6A:
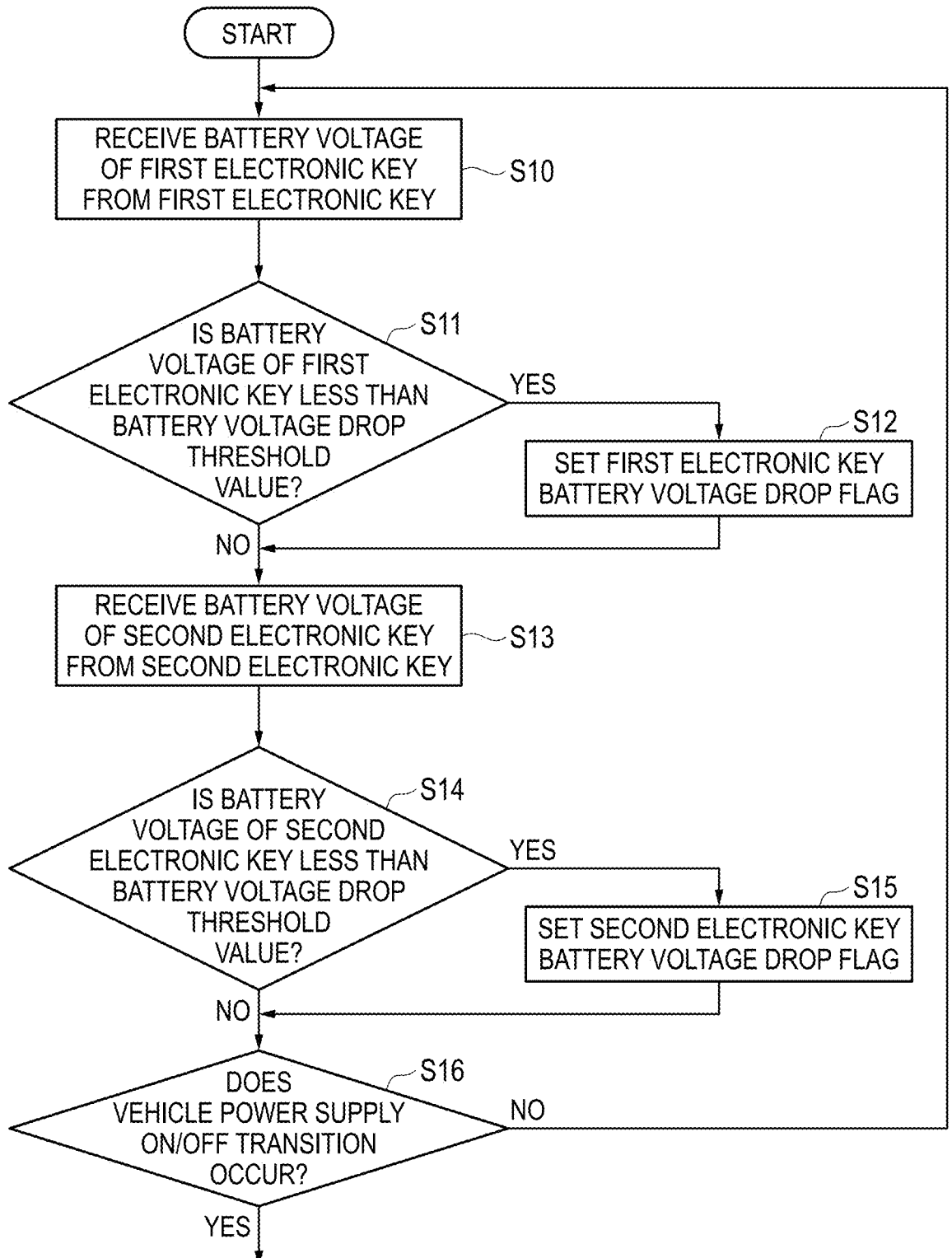
FIGS. 6A and 6B are a flowchart showing an operation of detection and notification of the battery voltage drop in the ECU of the electronic key system according to the first embodiment.
Figure 6B:
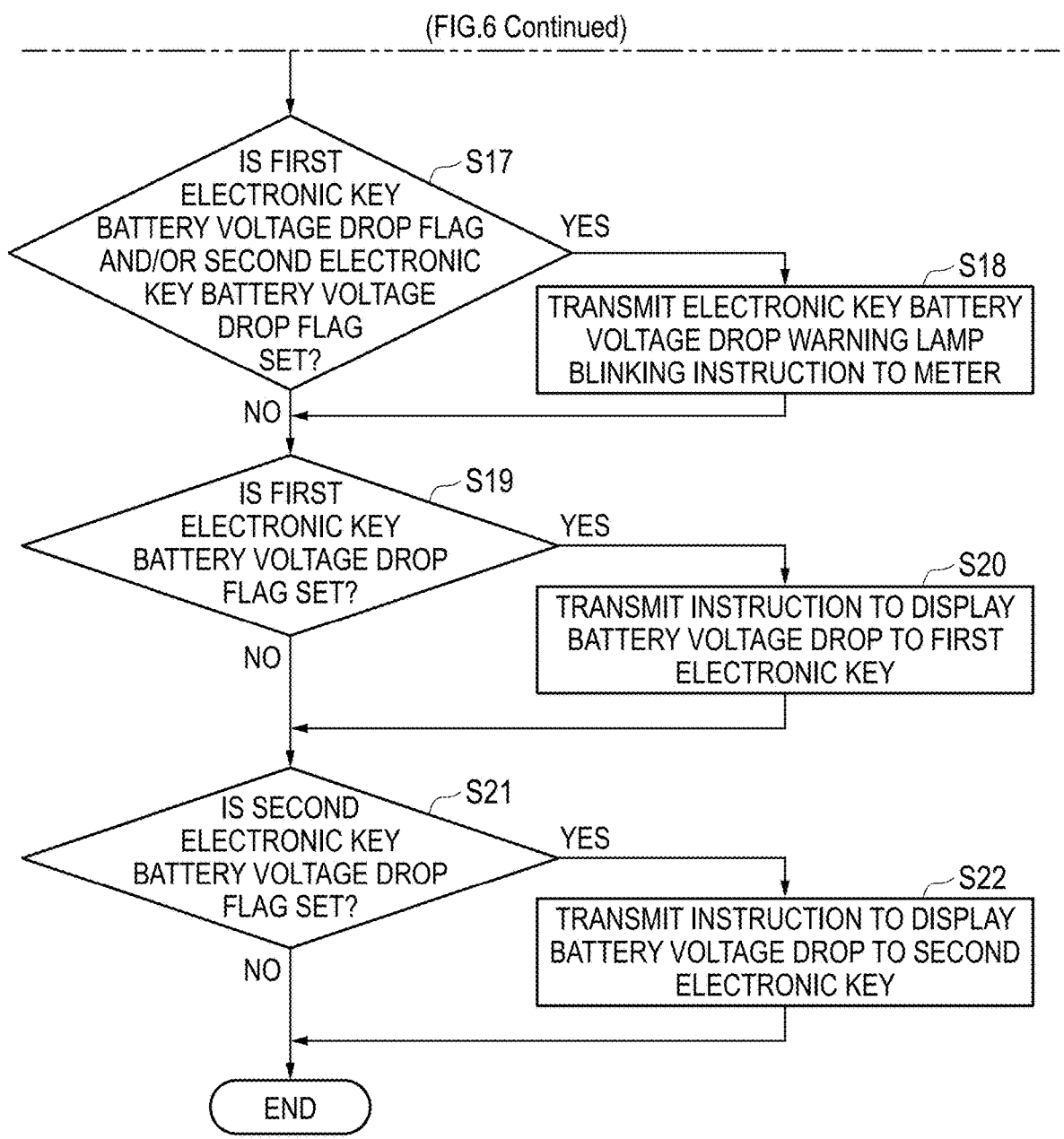

FIGS. 6A and 6B are a flowchart showing an operation of detection and notification of the battery voltage drop in the ECU 30 of the vehicle 20. A subject of the operation on a vehicle 20 side is the ECU 30, but in a description of the operation, the vehicle 20 will be taken as the subject. In FIGS. 6A and 6B, first, the vehicle 20 receives information on the battery voltage transmitted from the first electronic key 40-1 in a predetermined cycle (that is, the first information indicating the first voltage value) (step S10). After receiving the first information, the vehicle 20 determines whether the battery voltage of the first electronic key 40-1 is less than a battery voltage drop threshold value from the first information (step S11), and if it is determined that the battery voltage of the first electronic key 40-1 is less than the battery voltage drop threshold value (if it is determined as "YES" in step S11), the vehicle 20 sets a first electronic key battery voltage drop flag (step S12). After setting the first electronic key battery voltage drop flag by the ECU 30, the process proceeds to step S13. A process of step S13 will be described later.

On the other hand, in the determination in step S11, if the vehicle 20 determines that the battery voltage of the first electronic key 40-1 is equal to or higher than the battery voltage drop threshold value (if it is determined as "NO" in step S11), the vehicle 20 receives information on the battery voltage transmitted from the second electronic key 40-2 in a predetermined cycle (that is, the second information indicating the second voltage value) (step S13). After receiving the second information, the vehicle 20 determines whether the battery voltage of the second electronic key 40-2 is less than a battery voltage drop threshold value from the second information (step S14), and if it is determined that the battery voltage of the second electronic key 40-2 is less than the battery voltage drop threshold value (if it is determined as "YES" in step S14), the vehicle 20 sets a second electronic key battery voltage drop flag (step S15). After setting the second electronic key battery voltage drop flag by the ECU 30, the process proceeds to step S16. A process of step S16 will be described later.

On the other hand, in the determination of step S14, if the vehicle 20 determines that the battery voltage of the second electronic key 40-2 is equal to or higher than the battery voltage drop threshold value (if it is determined as "NO" in step S14), the vehicle 20 determines whether the power supply of the vehicle 20 transitions from ON to OFF or from OFF to ON (step S16), and if it is determined that the power supply does not transition from ON to OFF or from OFF to ON (if it is determined as "NO" in step S16), the process returns to the process of step S10.

On the other hand, in the determination of step S16, if it is determined that the power supply transitions from ON to OFF or from OFF to ON (if it is determined as "YES" in step S16), the vehicle 20 determines whether the first electronic key battery voltage drop flag and/or the second electronic key battery voltage drop flag is set (step S17). If it is determined that the first electronic key battery voltage drop flag and/or the second electronic key battery voltage drop flag is set (if it is determined as "YES" in step S17), the vehicle 20 transmits an electronic key battery voltage drop warning lamp blinking instruction to the meter 50 (step S18). After transmitting the electronic key battery voltage drop warning lamp blinking instruction to the meter 50 by the vehicle 20, the process proceeds to step S19. A process of step S19 will be described later.

On the other hand, in the determination of step S17, if it is determined that the first electronic key battery voltage drop flag and/or the second electronic key battery voltage drop flag is not set (if it is determined as "NO" in step S17), the vehicle 20 determines whether the first electronic key battery voltage drop flag is set (step S19). If it is determined that the first electronic key battery voltage drop flag is set (if it is determined as "YES" in step S19), the vehicle 20 transmits an instruction to display a battery voltage drop to the first electronic key 40-1 (step S20). After transmitting the instruction to display the battery voltage drop to the first electronic key 40-1 by the vehicle 20, the process proceeds to step S21. A process of step S21 will be described later.

On the other hand, in the determination of step S19, if it is determined that the first electronic key battery voltage drop flag is not set (if it is determined as "NO" in step S19), the vehicle 20 determines whether the second electronic key battery voltage drop flag is set (step S21). If it is determined that the second electronic key battery voltage drop flag is set (if it is determined as "YES" in step S21), the vehicle 20 transmits an instruction to display a battery voltage drop to the second electronic key 40-2 (step S22). After transmitting the instruction to display the battery voltage drop to the second electronic key 40-2 by the vehicle 20, the present process is ended.

On the other hand, in the determination of step S21, if the vehicle 20 determines that the second electronic key battery voltage drop flag is not set (if it is determined as "NO" in step S21), the present process is ended.

Figure 7:
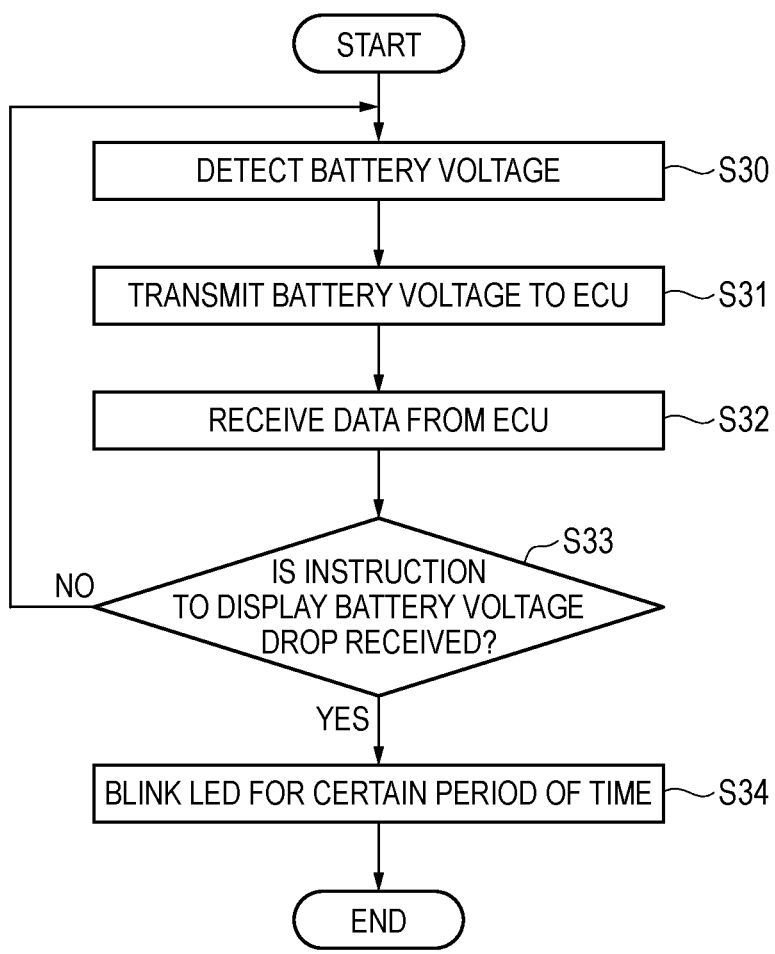
FIG. 7 is a flowchart showing an operation of detection and notification of the battery voltage drop in the electronic key of the electronic key system according to the first embodiment.

FIG. 7 is a flowchart showing an operation of detection and notification of the battery voltage drop in the electronic key 40. Since an operation of the first electronic key 40-1 and an operation of the second electronic key 40-2 are the same, the reference signs "−1, −2" for distinguishing the first electronic key 40-1 and the second electronic key 40-2 are omitted. A subject of the operation of the electronic key 40 is the control unit 406, but the electronic key 40 will be described as the subject of the operation.

In FIG. 7, the electronic key 40 detects the battery voltage of an own battery 403 (step S30), and transmits the detected battery voltage to the vehicle 20 (ECU 30) (step S31). In this case, the electronic key 40 transmits information related to the battery voltage (that is, the first information indicating the first voltage value). Next, data (information) reception from the vehicle (ECU 30) is started (step S32), and it is determined whether an instruction to display a battery voltage drop is received (step S33). If it is determined that the instruction to display the battery voltage drop from the vehicle 20 is not received (if it is determined as "NO" in step S33), the process returns to the process of step S30, and the processes of steps S30 to S33 are performed again, and if it is determined that the instruction to display the battery voltage drop from the vehicle is received (if it is determined as "YES" in step S33), the electronic key 40 blinks the LED 405 for a certain period of time (step S34).

As described above, in the electronic key system 10 of the first embodiment, the first electronic key 40-1 notifies the vehicle 20 of the first information corresponding to a voltage of the first battery by the wireless communication, and the second electronic key 40-2 notifies the vehicle of the second information corresponding to a voltage of the second battery by the wireless communication. In a case in which the battery voltage drop of the first electronic key 40-1, the vehicle 20 lights or blinks the warning lamp 502 of the meter 50 to output the notification of the battery voltage drop of the electronic key, and further outputs an instruction to display the battery voltage drop toward the first electronic key 40-1, and in response to this instruction, the first electronic key 40-1 blinks the LED 405-1 to notify the user carrying the first electronic key 40-1 that the battery voltage drops. In a case in which the battery voltage of the second electronic key 40-2 drops, the vehicle 20 lights or blinks the warning lamp 502 of the meter 50 to output the notification of the battery voltage drop of the electronic key, and further outputs an instruction to display the battery voltage drop toward the second electronic key 40-2, and in response to this instruction, the second electronic key 40-2 blinks the LED 405-2 to notify the user carrying the second electronic key 40-2 that the battery voltage drops. Consequently, it is possible to easily recognize which of the first electronic key 40-1 and the second electronic key 40-2 has a dropped battery voltage.

Second Embodiment

Next, an electronic key system according to a second embodiment will be described. In the electronic key system 10 of the first embodiment described above, the determination of the battery voltage drop is performed on an ECU 30 side, but in the electronic key system of the second embodiment, the electronic key itself performs a determination of the battery voltage drop. A reference sign 60 is given to the electronic key system of the second embodiment. A reference sign 70 is given to the vehicle, a reference sign 80 is given to the ECU, a reference sign 90-1 is given to the first electronic key, and a reference sign 90-2 is given to the second electronic key. When the first electronic key 90-1 and the second electronic key 90-2 are commonly referred to, the electronic key 90 is used.

Figure 8:
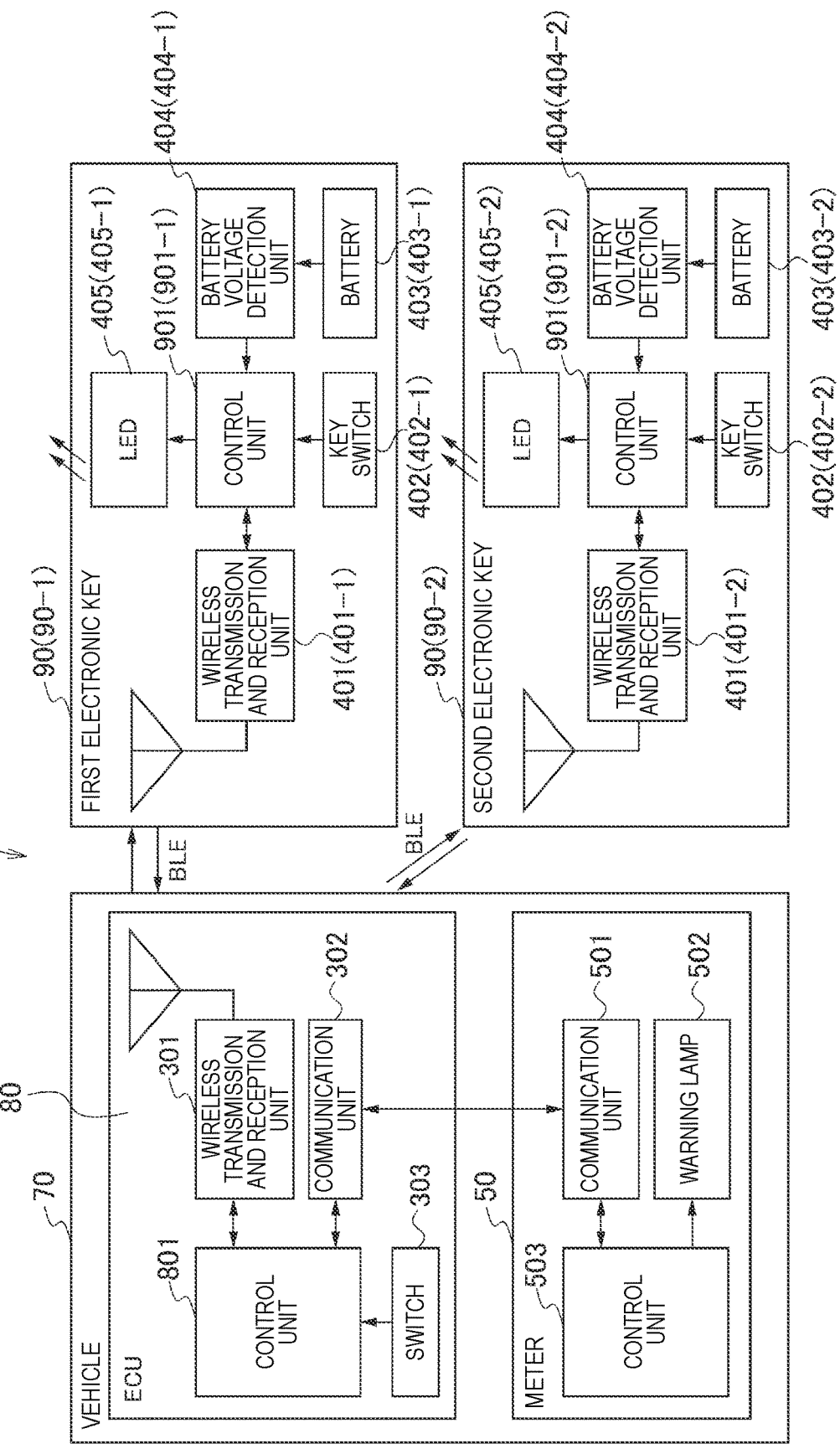
FIG. 8 is a block diagram showing a schematic configuration of each of an ECU, the meter, a first electronic key and a second electronic key of a vehicle included in an electronic key system according to a second embodiment.

FIG. 8 is a block diagram showing a schematic configuration of each of the ECU (control device) 80, the meter 50, the first electronic key 90-1 and the second electronic key 90-2 of the vehicle 70 included in the electronic key system 60. In FIG. 8, the first electronic key 90-1 notifies the vehicle 70 of a voltage drop of the battery 403-1 via the wireless communication in a case in which a voltage of the own battery (first battery) 403-1 is smaller than the first predetermined value. Similarly, the second electronic key 90-2 notifies the vehicle 70 of a voltage drop of the battery 403-2 via the wireless communication in a case in which a voltage of the own battery (second battery) 403-2 is smaller than the second predetermined value.

The ECU 80 of the vehicle 70 lights or blinks the warning lamp 502 of the meter 50 in response to reception of a notification that a battery voltage drops in either the first electronic key 90-1 or the second electronic key 90-2. The ECU 80 outputs a display timing instruction to the electronic key 90 that has output the notification of the battery voltage drop. For example, in a case in which the first voltage value of the first battery 403-1 of the first electronic key 90-1 is smaller than (less than) the first predetermined value and the second voltage value of the second battery 403-2 of the second electronic key 90-2 is not smaller than (equal to or higher than) the second predetermined value, the ECU 80 lights or blinks the warning lamp 502 of the meter 50 of the vehicle 70, and outputs the display timing instruction to the first electronic key 90-1.

Accordingly, the LED 405-1 of the first electronic key 90-1 blinks, and the LED 405-2 of the second electronic key 90-2 does not blink. A timing at which the display timing instruction is output is, for example, a time when the switch 303 is operated. When the switch 303 is operated, if there is an electronic key 90 that has output the notification of the battery voltage drop, the display timing instruction is output to the electronic key 90.

Figure 9:
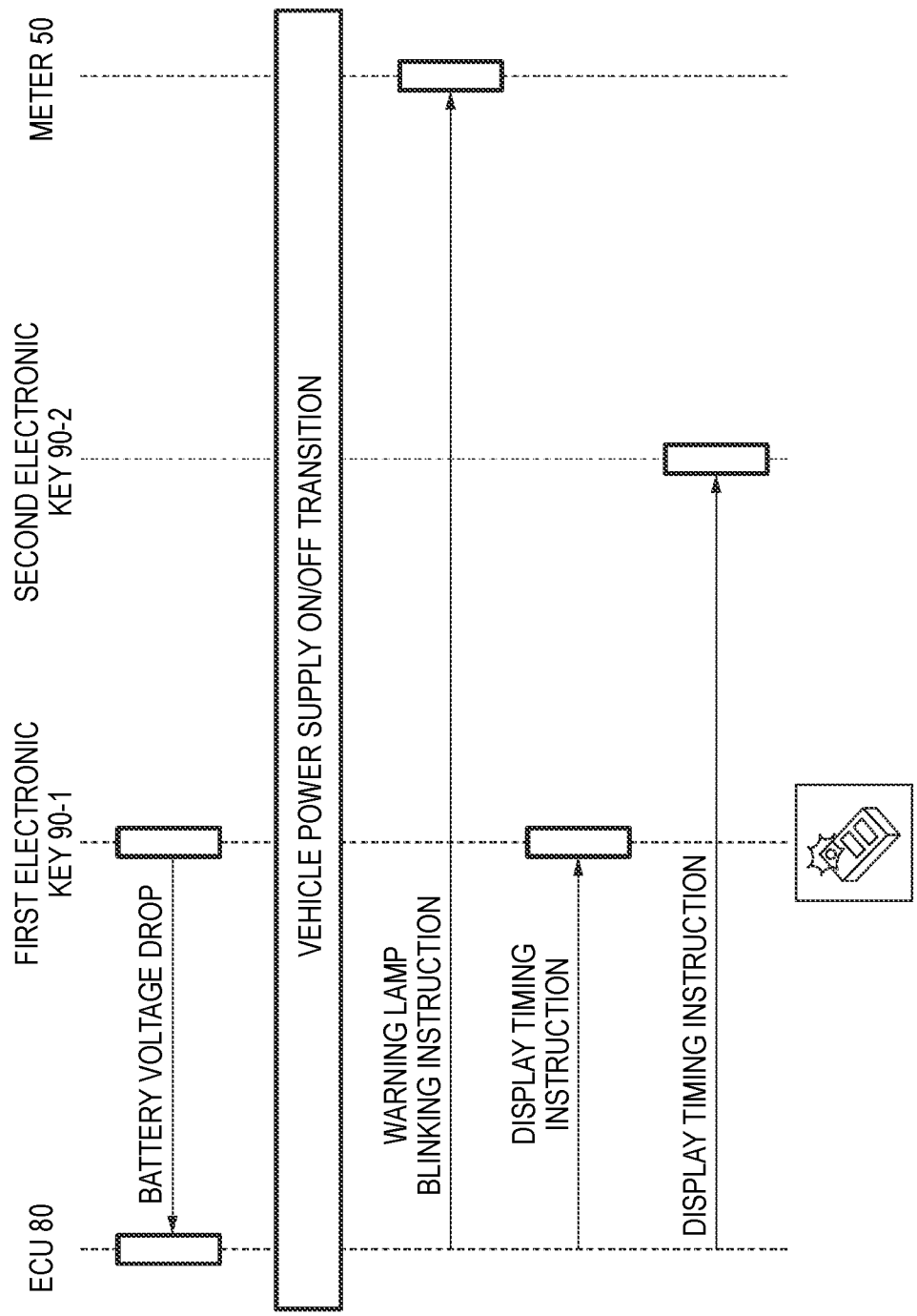
FIG. 9 is a sequence diagram showing an operation of detection and notification of a battery voltage drop in the ECU, the electronic key, and the meter of the electronic key system according to the second embodiment.

FIG. 9 is a sequence diagram showing an operation of detection and notification of a battery voltage drop in the ECU 80, the first electronic key 90-1, the second electronic key 90-2, and the meter 50 of the vehicle 70. An example in the figure shows a case where a battery voltage of the first electronic key 90-1 drops and a battery voltage of the second electronic key 90-2 does not drop.

In FIG. 9, in response to detection of a battery voltage drop, the first electronic key 90-1 transmits information related to the battery voltage drop to the ECU 80. Since the second electronic key 90-2 does not detect a battery voltage drop, the second electronic key 90-2 does not transmit information related to the battery voltage drop to the ECU 80. The ECU 80 receives the information related to the battery voltage drop transmitted from the first electronic key 90-1. In a case in which the switch 303 is operated in this state and power supply of the vehicle 70 transitions from ON to OFF or from OFF to ON, the ECU 80 transmits an electronic key battery voltage drop warning lamp blinking instruction to the meter 50 to light or blink the warning lamp 502. The ECU 80 outputs a display timing instruction to both the first electronic key 90-1 and the second electronic key 90-2. In response to reception of the electronic key battery voltage drop warning lamp blinking instruction transmitted from the ECU 80, the control unit 503 of the meter 50 lights or blinks the warning lamp 502. In response to reception of the display timing instruction transmitted from the ECU 80, the first electronic key 90-1 blinks the LED 405-1. Even if the second electronic key 90-2 receives the display timing instruction transmitted from the ECU 80, since the second electronic key 90-2 does not detect an own battery voltage drop, the second electronic key 90-2 does not blink the LED 405-2. Also in the present embodiment, the warning lamp 502 and the LED 405-1 may be lit instead of blinking.

Figure 10:
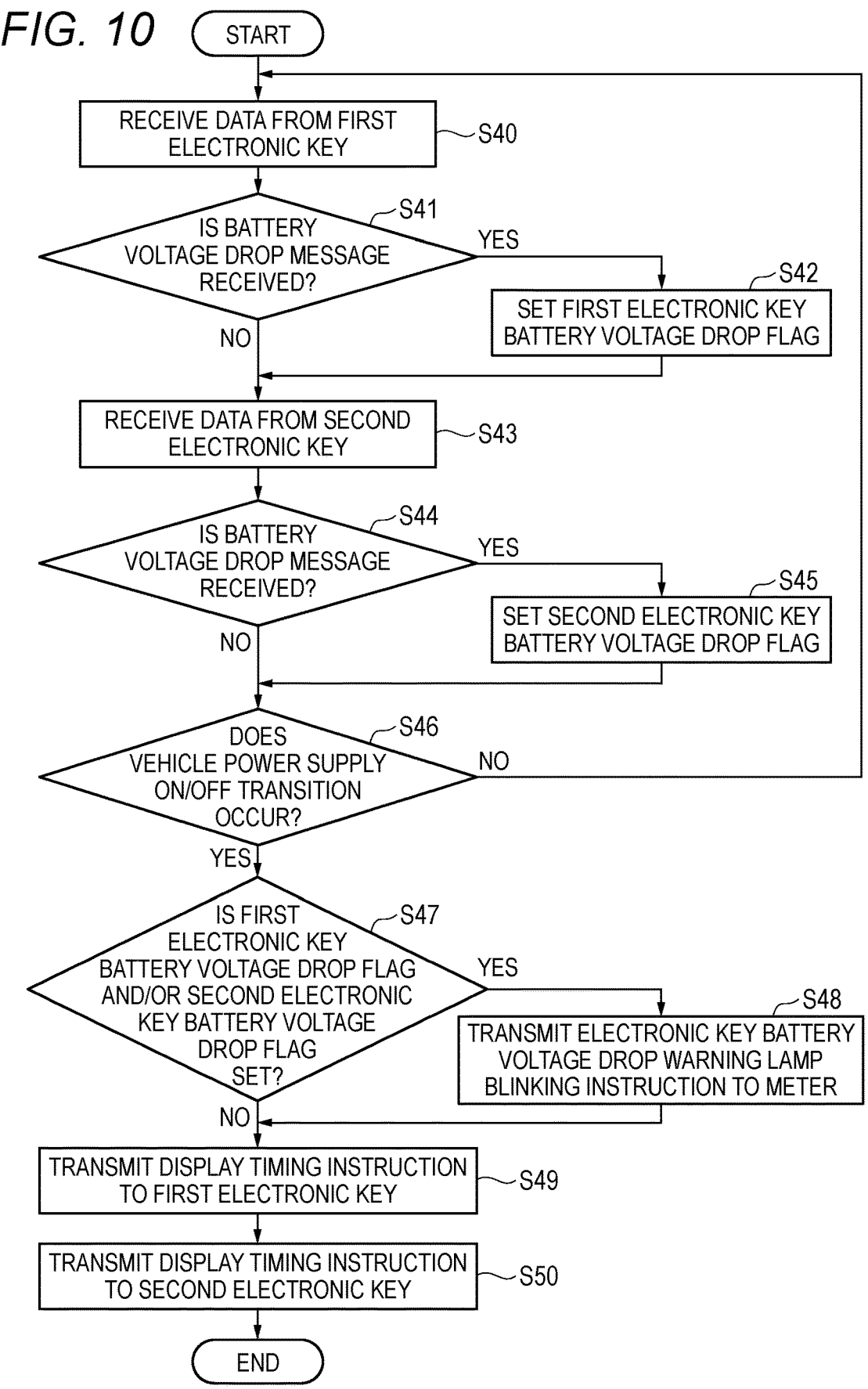
FIG. 10 is a flowchart showing an operation of detection and notification of the battery voltage drop in the ECU of the electronic key system according to the second embodiment.

FIG. 10 is a flowchart showing an operation of detection and notification of the battery voltage drop in the ECU 80 of the vehicle 70. A subject of the operation on a vehicle 70 side is the ECU 80, but in a description of the operation, the vehicle 70 will be taken as the subject. In FIG. 10, first, the vehicle 70 receives data from the first electronic key 90-1 (step S40). Next, the vehicle 70 determines whether the data from the first electronic key 90-1 is a battery voltage drop message (step S41), and if it is determined that the data is a battery voltage drop message (if it is determined as "YES" in step S41), the vehicle 70 sets a first electronic key battery voltage drop flag (step S42). After setting the first electronic key battery voltage drop flag by the vehicle 70, the process proceeds to step S43. A process of step S43 will be described later.

On the other hand, in the determination in step S41, if it is determined that the data from the first electronic key 90-1 is not the battery voltage drop message (if it is determined as "NO" in step S41), the vehicle 70 receives data from the second electronic key 90-2 (step S43). Next, the vehicle 70 determines whether the data from the second electronic key 90-2 is a battery voltage drop message (step S44), and if it is determined that the data is a battery voltage drop message (if it is determined as "YES" in step S44), the vehicle 70 sets a second electronic key battery voltage drop flag (step S45). After setting the second electronic key battery voltage drop flag by the vehicle 70, the process proceeds to step S46. A process of step S46 will be described later.

On the other hand, in the determination of step S44, if it is determined that the data from the second electronic key 90-2 is not the battery voltage drop message (if it is determined as "NO" in step S44), the vehicle 70 determines whether the power supply of the vehicle 70 transitions from ON to OFF or from OFF to ON (step S46), and if it is determined that the power supply does not transition from ON to OFF or from OFF to ON (if it is determined as "NO" in step S46), the process returns to the process of step S40.

On the other hand, in the determination of step S46, if the vehicle 70 determines that the power supply transitions from ON to OFF or from OFF to ON (if it is determined as "YES" in step S46), the vehicle 70 determines whether the first electronic key battery voltage drop flag and/or the second electronic key battery voltage drop flag is set (step S47). If it is determined that the first electronic key battery voltage drop flag and/or the second electronic key battery voltage drop flag is set (if it is determined as "YES" in step S47), the vehicle 70 transmits an electronic key battery voltage drop warning lamp blinking instruction to the meter 50 (step S48). After transmitting the electronic key battery voltage drop warning lamp blinking instruction to the meter 50 by the vehicle 70, the process proceeds to step S49. A process of step S49 will be described later.

On the other hand, in the determination of step S47, if it is determined that the first electronic key battery voltage drop flag and/or the second electronic key battery voltage drop flag is not set (if it is determined as "NO" in step S47), the vehicle 70 transmits a display timing instruction to the first electronic key 90-1 (step S49). Next, a display timing instruction is also transmitted to the second electronic key 90-2 (step S50). After performing the process of step S50 by the vehicle 70, the present process is ended.

Figure 11:
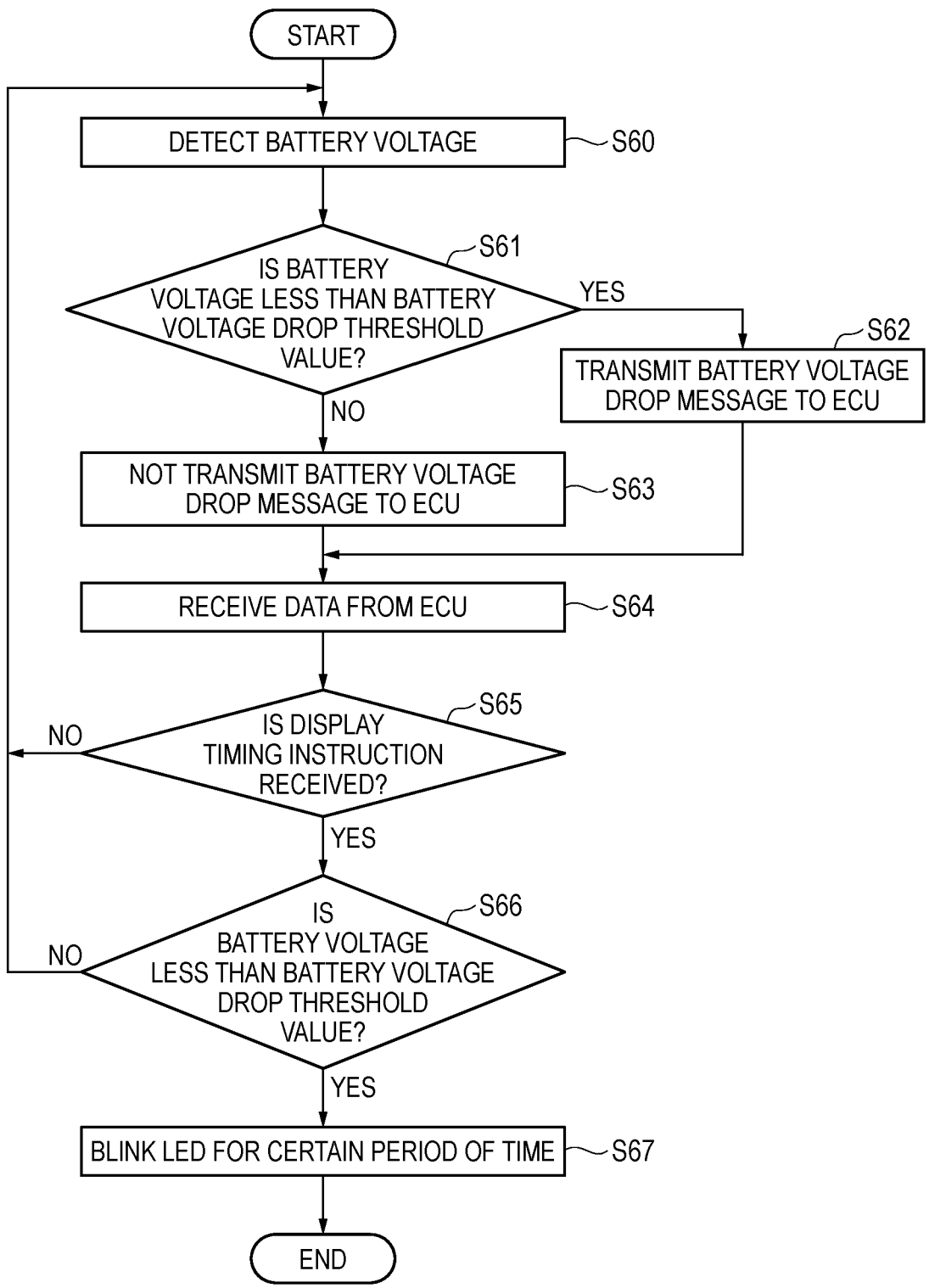
FIG. 11 is a flowchart showing an operation of detection and notification of the battery voltage drop in the electronic key of the electronic key system according to the second embodiment.

FIG. 11 is a flowchart showing an operation of detection and notification of the battery voltage drop in the electronic key 90. Since an operation of the first electronic key 90-1 and an operation of the second electronic key 90-2 are the same, the reference signs "−1, −2" for distinguishing the first electronic key 90-1 and the second electronic key 90-2 are omitted. A subject of the operation of the electronic key 90 is a control unit 901, but the electronic key 90 will be described as the subject of the operation.

In FIG. 11, the electronic key 90 detects the battery voltage of the battery 403 (step S60), and determines whether the detected battery voltage is less than the battery voltage drop threshold value (step S61). If it is determined that the battery voltage of the battery 403 is less than the battery voltage drop threshold value ("YES" in the determination of step S61), the electronic key 90 transmits a battery voltage drop message to the vehicle 70 (ECU 80) (step S62). After transmitting the battery voltage drop message to the vehicle 70 by the electronic key 90, the process proceeds to step S64. A process of step S64 will be described later.

On the other hand, in the determination in step S61, if it is determined that the battery voltage of the battery 403 is not less than the battery voltage drop threshold value (that is, equal to or higher than the battery voltage drop threshold value) ("NO" in the determination of step S61), the electronic key 90 does not transmit the battery voltage drop message to the vehicle 70 (ECU 80) (step S63), and receives the data from the vehicle 70 (ECU 80) (step S64). Next, it is determined whether a display timing instruction is received (step S65). If the electronic key 90 determines that the display timing instruction is not received (if it is determined as "NO" in step S65), the process returns to step S60.

On the other hand, if the electronic key 90 determines that the display timing instruction is received (if it is determined as "YES" in step S65), the electronic key 90 determines whether the battery voltage of the battery 403 is less than the battery voltage drop threshold value (step S66). If the electronic key 90 determines that the battery voltage of the battery 403 is not less than the battery voltage drop threshold value (equal to or higher than the battery voltage drop threshold value) ("NO" in the determination of step S66), the process returns to step S60.

On the other hand, if the electronic key 90 determines that the battery voltage of the battery 403 is less than the battery voltage drop threshold value (if it is determined as "YES" in the determination of step S66), the electronic key 90 blinks the LED 405 for a certain period of time (step S67). After blinking the LED 405 for a certain period of time by the electronic key 90, the present process is ended.

As described above, in the electronic key system 60 of the second embodiment, the first electronic key 90-1 notifies the vehicle 70 that the voltage of the battery 403-1 drops by the wireless communication in a case in which a voltage of an own battery 403-1 is smaller than the first predetermined value, and the second electronic key 90-2 notifies the vehicle 70 that the voltage of the battery 403-2 drops by the wireless communication in a case in which a voltage of an own battery 403-2 is smaller than the second predetermined value. The vehicle 70 receives the notification that the battery voltage drops from at least one of the first electronic key 90-1 and the second electronic key 90-2, and at a timing when the power supply of the vehicle 70 transitions from ON to OFF or from OFF to ON, the vehicle 70 lights or blinks the warning lamp 502 of the meter 50, and outputs the display timing instruction to the electronic key 90 that has output the notification of the battery voltage drop. The electronic key 90 that has output the notification of the battery voltage drop receives the display timing instruction, the electronic key 90 blinks the own LED 405 and notifies the user carrying the electronic key 90 that the battery voltage drops. Consequently, it is possible to easily recognize which of the first electronic key 90-1 and the second electronic key 90-2 has a dropped battery voltage.

Third Embodiment

Figure 12:
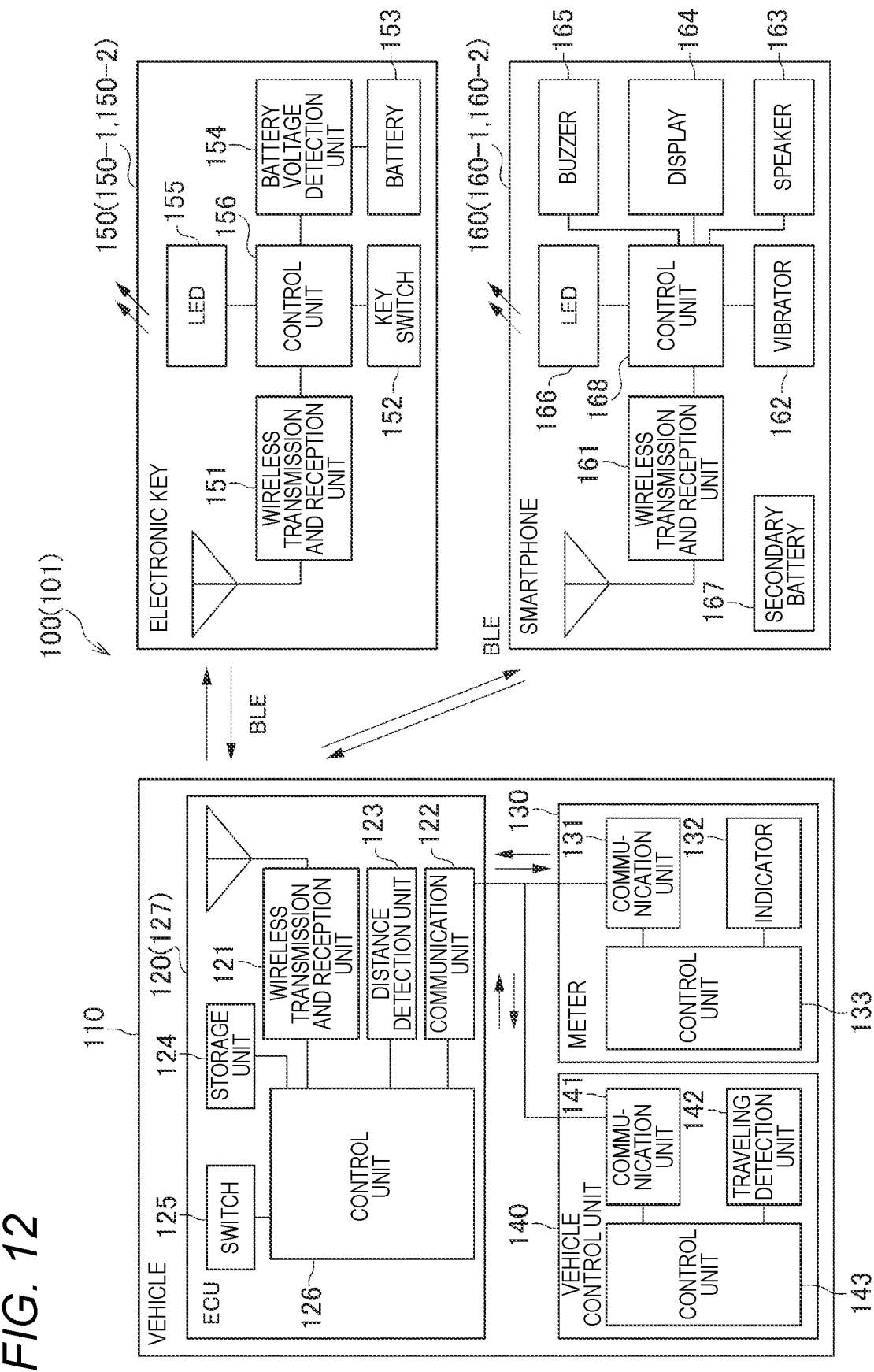
FIG. 12 is a block diagram showing a schematic configuration of a vehicle wireless communication system according to a third embodiment.

Next, a vehicle wireless communication system according to a third embodiment will be described. The vehicle wireless communication system according to the third embodiment prevents a failure to carry a carry-on item carried by a user who uses the vehicle. FIG. 12 is a block diagram showing a schematic configuration of a vehicle wireless communication system 100 according to the third embodiment. In the figure, the vehicle wireless communication system 100 of the third embodiment is applied to a two-wheeled vehicle 110 (see FIG. 15) similar to the electronic key systems 10 and 60 of the first and second embodiments described above, and the vehicle wireless communication system 100 includes an ECU (control device) 120 mounted on the vehicle 110, a meter 130, a vehicle control unit 140, and an electronic key 150 and a smartphone 160 carried by a user who uses the vehicle 110.

The ECU 120 includes a wireless transmission and reception unit 121 that performs two-way communication with each of the electronic key 150 and the smartphone 160 using Bluetooth (registered trademark) LE, a communication unit 122 that performs two-way communication with each of the meter 130 and the vehicle control unit 140 of the vehicle 110 by wire, a distance detection unit 123 that detects a distance to the electronic key 150 and to the smartphone 160, a storage unit 124 that stores pair information of the electronic key 150 and the smartphone 160, a switch 125 that turns on and off power supply of the vehicle 110, and a control unit 126 that controls the wireless transmission and reception unit 121, the communication unit 122, the distance detection unit 123, and the storage unit 124, and receives an ON or OFF signal output from the switch 125. In the vehicle wireless communication system 100 of the third embodiment, an ignition switch is used as the switch 125.

The distance detection unit 123 measures a distance to the electronic key 150 or the smartphone 160 according to a method using received signal strength indication (RSSI), time of flight (TOF), phase information of radio waves, or the like. The RSSI is used for the purpose of controlling a transmission range or the like in the wireless communication such as wireless LAN or Bluetooth. The TOF transmits radio waves to an object and measures a distance to the object based on a time required for a response from the object. In the method using phase information of radio waves, a distance is estimated based on wavelength and phase information for each frequency.

The control unit 126 includes a central processing unit (CPU) (not shown), a read only memory (ROM) storing a program for controlling the CPU, and a random access memory (RAM) used for an operation of the CPU, and performs control related to a failure to carry a carry-on item such as the electronic key 150 or the smartphone 160 carried by the user who uses the vehicle 110 as a part of the control.

The meter 130 includes a communication unit 131 that performs two-way communication with each of the ECU 120 and the vehicle control unit 140 by wire, an indicator 132 that includes a display circuit (including a liquid crystal display, an organic electro-luminescence (EL), and the like) that displays information related to a failure to carry the electronic key 150 and the smartphone 160, and a control unit 133 that controls the communication unit 131 and the indicator (output circuit of the vehicle 110) 132.

Figure 13:
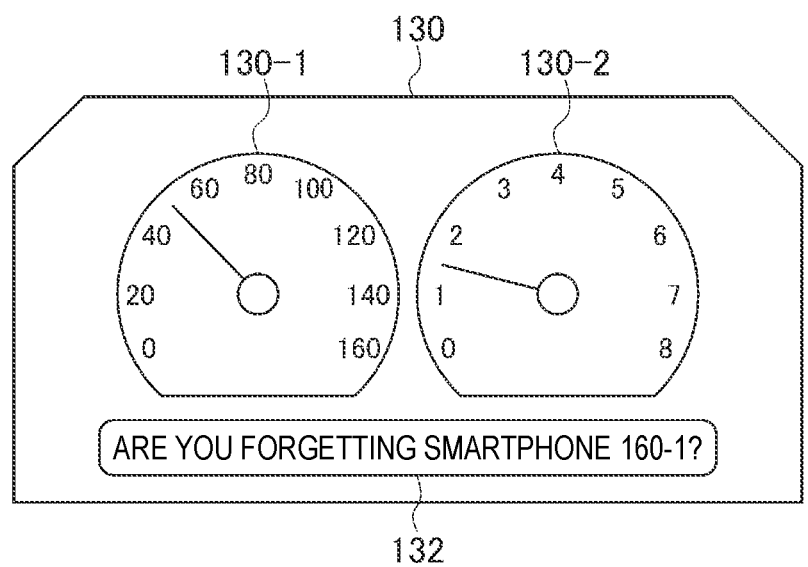
FIG. 13 is a front view showing an appearance of a meter included the vehicle wireless communication system according to the third embodiment.

FIG. 13 is a front view showing an appearance of the meter 130. As shown in the figure, the meter 130 includes a speedometer 130-1 and an engine tachometer 130-2 in addition to the indicator 132. The speedometer 130-1 displays a vehicle speed of the vehicle 110, and the engine tachometer 130-2 displays a number of revolutions of an engine (not shown) of the vehicle 110. The meter 130 is disposed at a central portion of a steering wheel (not shown) of the vehicle 110. The indicator 132 displays that there is a possibility of a failure to carry the electronic key 150 or the smartphone 160. It is possible to appeal a user's visual sense about a failure to carry the electronic key 150 or the smartphone 160 by the indicator 132. The indicator 132 may include a speaker (not shown), and in a case where the speaker is provided, the speaker emits a sound to indicate a notification that there is a possibility of a failure to carry the electronic key 150 or the smartphone 160. It is possible to appeal a user's hearing about a failure to carry the electronic key 150 or the smartphone 160.

Similar to the control unit 126 of the ECU 120, the control unit 133 of the meter 130 includes a CPU (not shown), a ROM storing a program for controlling the CPU, and a RAM used for an operation of the CPU, and controls display of the vehicle speed and the number of revolutions of the engine, and controls display of a failure to carry the electronic key 150 and the smartphone 160.

The vehicle control unit 140 includes a communication unit 141 that performs two-way communication with each of the ECU 120 and the meter 130 by wire, a traveling detection unit 142 that detects traveling of the vehicle 110, and a control unit 143 that controls the communication unit 141 and the traveling detection unit 142. The traveling detection unit 142 detects traveling of the vehicle 110 by, for example, capturing an output of a speedometer (not shown) mounted on the vehicle 110. In response to detection of the traveling of the vehicle 110 by the traveling detection unit 142, the control unit 143 notifies the ECU 120 of a vehicle traveling state. Similar to the control unit 126 of the ECU 120, the control unit 143 of the vehicle control unit 140 includes a CPU (not shown), a ROM storing a program for controlling the CPU, and a RAM used for an operation of the CPU, and performs control for notifying the ECU 120 of a traveling state of the vehicle 110.

Communication between the ECU 120 and the meter 130, communication between the ECU 120 and the vehicle control unit 140, and communication between the meter 130 and the vehicle control unit 140 may be performed wirelessly.

In FIG. 12, the electronic key 150 includes a wireless transmission and reception unit 151 that performs two-way communication with the ECU 120 using the Bluetooth LE, a key switch 152 that performs a predetermined operation with respect to the vehicle 110, a battery 153 that supplies power to each unit of the electronic key 150, a battery voltage detection unit 154 that detects a battery voltage of the battery 153, an LED 155 that indicates a state of a battery of the electronic key 150, and a control unit 156 that controls the wireless transmission and reception unit 151 and the LED 155, and captures a switch signal of the key switch 152 and a detection result of the battery voltage detection unit 154. The electronic key 150 corresponds to the first communication device or the second communication device.

Figure 14:
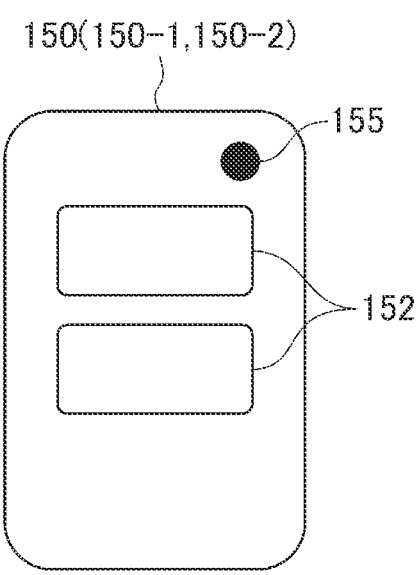
FIG. 14 is a front view showing an appearance of an electronic key included the vehicle wireless communication system according to the third embodiment.

FIG. 14 is a front view showing an appearance of the electronic key 150. As shown in the figure, the key switch 152 and the LED 155 are provided on a front side of the electronic key 150. In a case in which a voltage of the battery 153 drops below a predetermined value from the detection result of the battery voltage detection unit 154, the control unit 156 lights or blinks the LED 155. Unique identification information (for example, a serial number other than the key information) is given to the electronic key 150, and is stored in a non-volatile memory (not shown) such as a ROM that forms the control unit 156. In response to a request for identification information from the ECU 120, the control unit 156 transmits the identification information to the ECU 120. The identification information is used for pairing with the smartphone 160. Details of pairing between the electronic key 150 and the smartphone 160 will be described later.

The smartphone 160 includes a wireless transmission and reception unit 161 that performs two-way communication with the ECU 120 using the Bluetooth LE, a vibrator 162 that generates mechanical vibration, a speaker 163 that generates a sound such as music or sound, a display 164 that displays characters and symbols, a buzzer 165 that generates a buzzer sound, an LED 166 that indicates an operation state of the smartphone 160, a secondary battery 167 that supplies power to each unit of the smartphone 160, and a control unit 168 that controls the wireless transmission and reception unit 161, the vibrator 162, the display 164, and the LED 166, and outputs a sound signal to the speaker 163 and outputs a drive signal to the buzzer 165. The display 164 is at least a display circuit capable of displaying an image. The smartphone 160 corresponds to the first communication device or the second communication device. In this case, if the electronic key 150 is the first communication device, the smartphone 160 is the second communication device, and if the electronic key 150 is the second communication device, the smartphone 160 is the first communication device.

Figure 15:
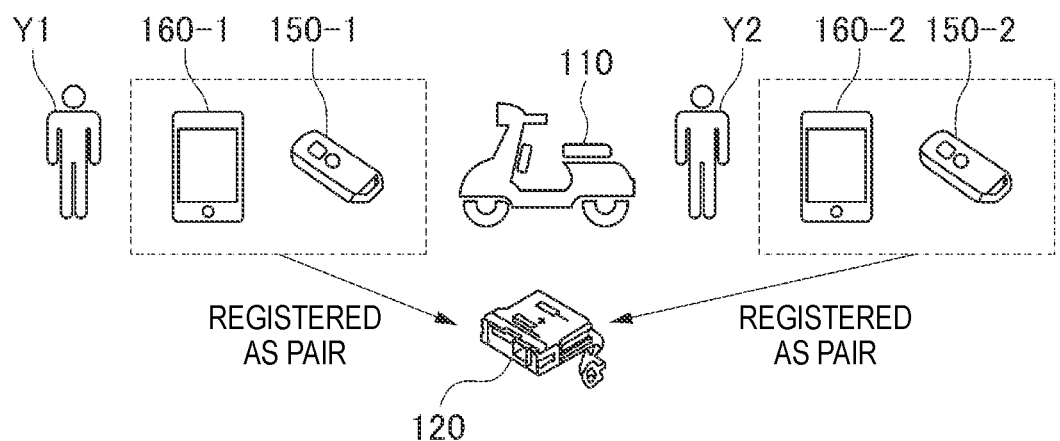
FIG. 15 is a diagram showing pairing of the electronic key and a smartphone included in the vehicle wireless communication system according to the third embodiment.

Next, a function of outputting a notification of a failure to carry the carry-on item implemented by the vehicle wireless communication system 100 of the third embodiment will be described. First, electronic keys 150-1 and 150-2 and smartphones 160-1 and 160-2 carried by the user who uses the vehicle 110 are registered in association with each other. FIG. 15 is a schematic diagram showing pairing between the electronic keys 150-1 and 150-2 and the smartphones 160-1 and 160-2. As shown in the figure, in a case in which there are two users Y1 and Y2, the user Y1 registers the own electronic key 150-1 and smartphone 160-1 as a pair to the ECU 120. The user Y2 registers the own electronic key 150-2 and smartphone 160-2 as a pair to the ECU 120.

Figure 16:
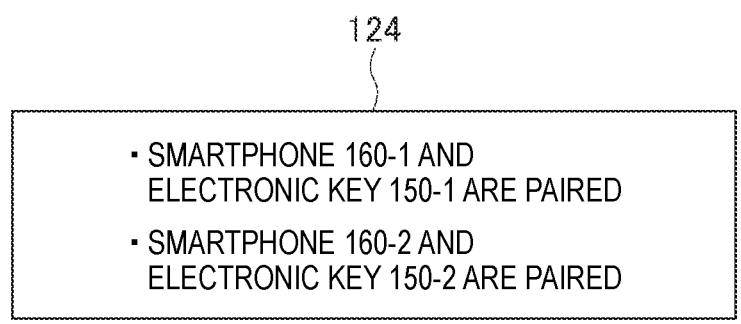
FIG. 16 is an image diagram of pair information stored in a storage unit of an ECU included in the vehicle wireless communication system according to the third embodiment.

At the time of pairing, the ECU 120 performs two-way communication using the Bluetooth LE with each of the electronic keys 150-1 and 150-2 and the smartphones 160-1 and 160-2, and acquires the above identification information from each of the electronic keys 150-1 and 150-2 and the smartphones 160-1 and 160-2. Then, the acquired identification information is used for storing a pair in the storage unit 124. FIG. 16 is an image diagram of the pair information stored in the storage unit 124. As shown in the figure, data indicating the smartphone 160-1 (including the identification information) and data indicating the electronic key 150-1 (including the identification information) are paired, and data indicating the smartphone 160-2 (including the identification information) and data indicating the electronic key 150-2 (including the identification information) are paired. Thus, pairing between the electronic key 150-1 and the smartphone 160-1 and pairing between the electronic key 150-2 and the smartphone 160-2 are performed.

Figure 17:
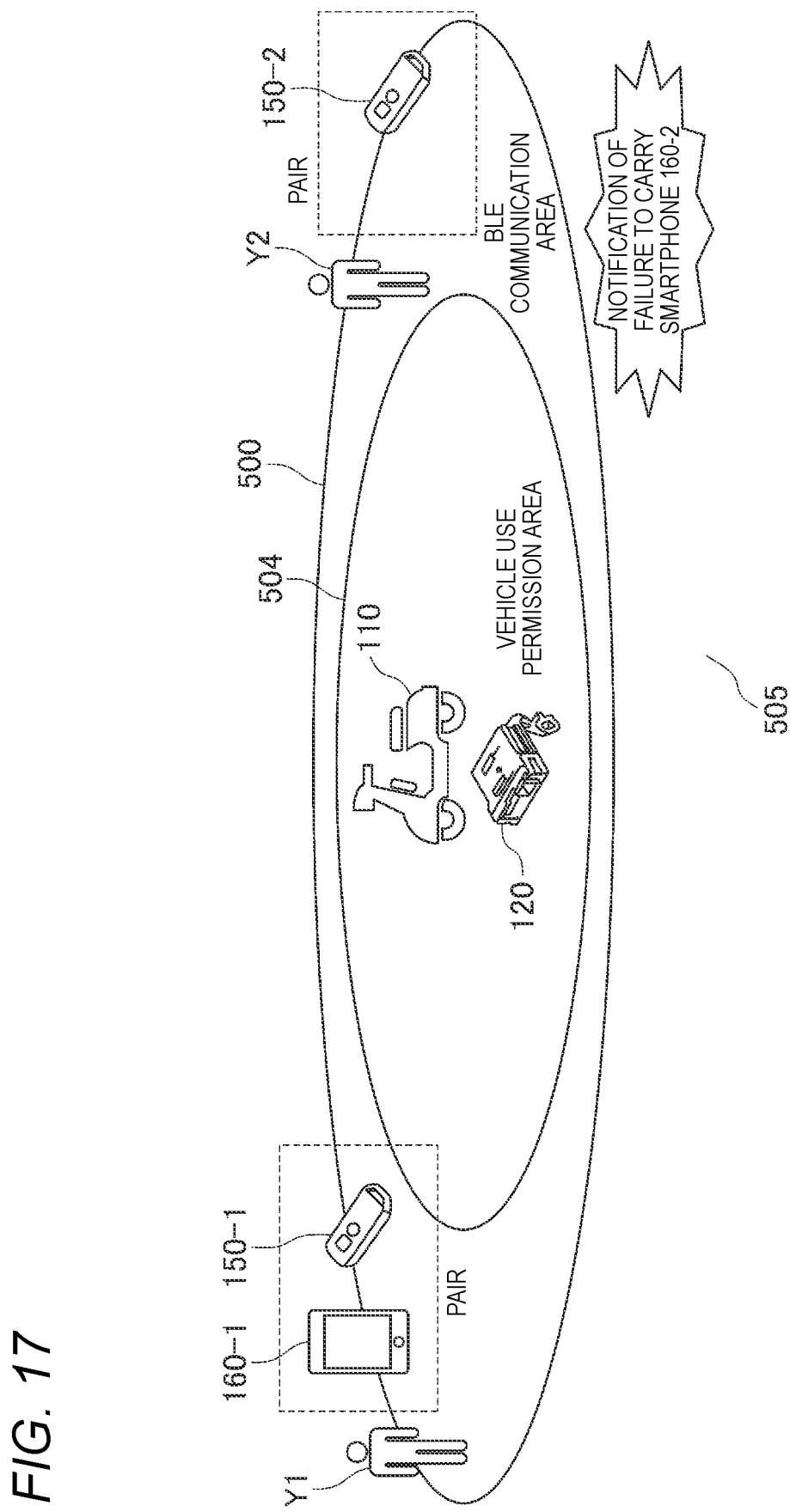
FIG. 17 is a diagram showing a processing of the ECU when the smartphone is forgotten in the vehicle wireless communication system according to the third embodiment.

After the pairing of the electronic key 150 and the smartphone 160 is performed, the notification of a failure to carry the carry-on item in a case in which the vehicle 110 is used with the paired electronic key 150 and the smartphone 160 is performed as follows. FIG. 17 is a diagram showing a processing of the ECU 120 in a case in which the user Y2 fails to carry the smartphone 160-2. As shown in the figure, the user Y1 carries the electronic key 150-1 and the smartphone 160-1, and the user Y2 carries the electronic key 150-2 but fails to carry the smartphone 160-2.

In a case in which the electronic key 150-1 and the smartphone 160-1 of the user Y1 enter a BLE communication area (second area) 500 capable of performing communication with the ECU 120 of the vehicle 110 by the Bluetooth LE, the ECU 120 detects a distance between the ECU 120 and the electronic key 150-1 and a distance between the ECU 120 and the smartphone 160-1. In a case in which the electronic key 150-2 of the user Y2 enters the BLE communication area 500, the ECU 120 detects a distance between the ECU 200 and the electronic key 150-2.

In a case in which the electronic key 150-1 of the user Y1 enters a vehicle use permission area (first area) 504 including one point (for example, a driver seat) located inside the vehicle 110, the ECU 120 enables use of the vehicle 110. In a case in which the electronic key 150-1 is positioned in the BLE communication area 500 and the smartphone 160-1 paired with the electronic key 150-1 is positioned in a third area 505, the ECU 120 does not give any instruction to the meter 130. That is, notification of a failure to carry the smartphone 160-1 is not performed.

The third area 505 may be, for example, an area including the BLE communication area 500 and extending outside the BLE communication area 500, or may be the same as the BLE communication area 500.

The vehicle use permission area 504 and the BLE communication area 500 may be the same.

In a case in which the electronic key 150-2 of the user Y2 enters the vehicle use permission area 504 including one point located inside the vehicle 110, the ECU 120 enables the use of the vehicle 110. In a case in which the electronic key 150-2 is positioned in the BLE communication area 500 and the smartphone 160-2 paired with the electronic key 150-2 is not positioned in the third area 505 outside the BLE communication area 500 and the vehicle 110 is in a traveling state, the ECU 120 causes the meter 130 to output the notification that there is a possibility of a failure to carry the smartphone 160-2. In accordance with an instruction from the ECU 120, the control unit 133 of the meter 130 causes the indicator 132 to display a notification of a failure to carry the smartphone 160-2. The BLE communication area 500 and the third area 505 may be the same.

Figure 18:
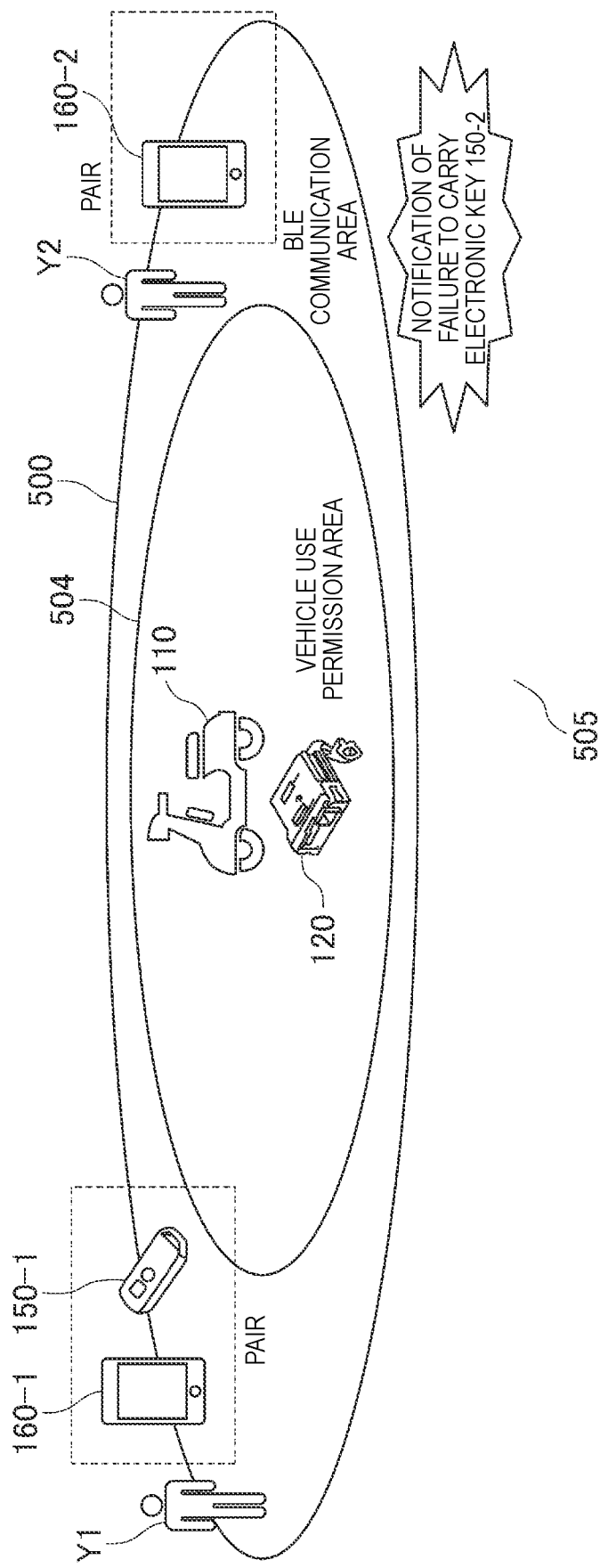
FIG. 18 is a diagram showing a processing of the ECU in the vehicle wireless communication system according to the third embodiment, in a case in which there is a failure to carry the electronic key.

The example shown in FIG. 17 is a case where the user Y2 fails to carry the smartphone 160-2. In another case in which the user Y2 fails to carry the electronic key 150-2, the following operation is performed. FIG. 18 is a diagram showing a processing of the ECU 120 in a case in which the user Y2 fails to carry the electronic key 150-2. As shown in the figure, the user Y1 carries the electronic key 150-1 and the smartphone 160-1, and the user Y2 carries the smartphone 160-2 but fails to carry the electronic key 150-2.

In a case in which the electronic key 150-1 of the user Y1 enters the vehicle use permission area 504 including one point located inside the vehicle 110, the ECU 120 enables the use of the vehicle 110. In a case in which the smartphone 160-2 is positioned in the BLE communication area 500, the electronic key 150-2 paired with the smartphone 160-2 is not positioned in the third area 505 outside the BLE communication area 500 and the vehicle 110 is in a traveling state, the ECU 120 causes the meter 130 to output the notification that there is a possibility of a failure to carry the electronic key 150-2. In accordance with an instruction from the ECU 120, the control unit 133 of the meter 130 causes the indicator 132 to display a notification of a failure to carry the electronic key 150-2.

Thus, the ECU 120 detects the electronic key 150 in the vicinity of the vehicle 110 while the vehicle 110 is traveling, and in a case in which the smartphone 160 associated with all the detected electronic keys 150 cannot be detected in the vicinity of the vehicle 110, the ECU 120 notifies the meter 130 of a failure to carry the smartphone 160. The notification of a failure to carry the electronic key 150 or the smartphone 160 can be performed for a failure to carry the electronic key 150 and the smartphone 160 even when three or more passengers get on the vehicle 110. Since the vehicle wireless communication system 100 according to the present embodiment is applied to the vehicle 110 of two wheels, only two people can get on the vehicle 110, but when the vehicle wireless communication system 100 is applied to a vehicle (not shown) of four wheels, it is possible to notify three or more passengers of a failure to carry the electronic key 150 and the smartphone 160.

Figure 19:
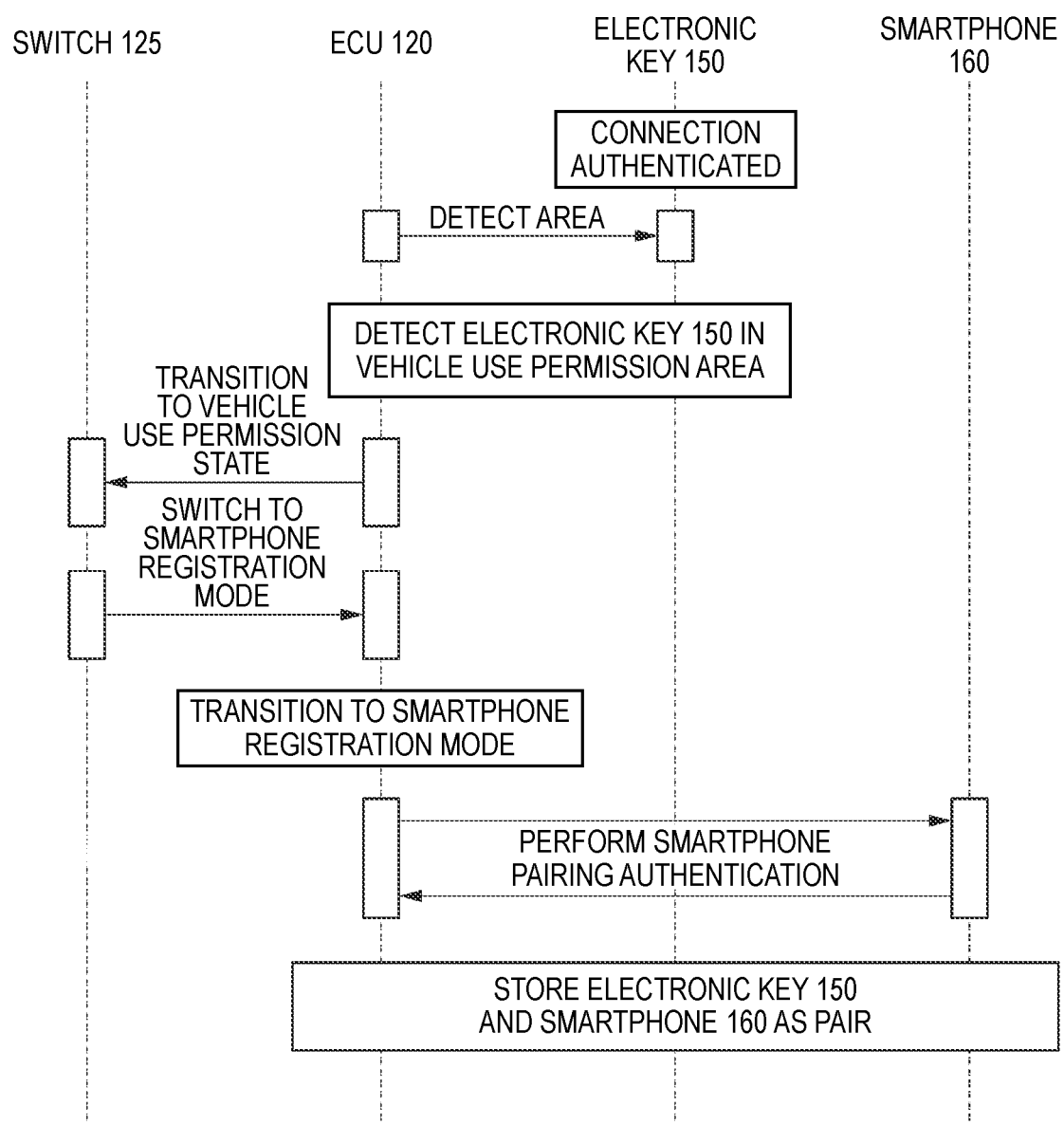
FIG. 19 is a sequence diagram showing a pairing operation in the ECU, the electronic key, and the smartphone included in the vehicle wireless communication system according to the third embodiment.

Next, operations of the ECU 120, the electronic key 150, and the smartphone 160 in the vehicle wireless communication system 100 of the third embodiment will be described with reference to a sequence diagram and a flowchart. FIG. 19 is a sequence diagram showing a pairing operation in the ECU 120, the electronic key 150, and the smartphone 160 included in the vehicle wireless communication system 100 according to the third embodiment. In the figure, after performing connection authentication with the electronic key 150, the ECU 120 performs distance detection to detect an area where the electronic key 150 exists. In a case in which the ECU 120 detects that the electronic key 150 is in the vehicle use permission area 504, the ECU 120 transitions to a vehicle use permitted state, and notifies the switch 125 of the transition to the vehicle use permitted state. In a case in which the switch 125 notifies the ECU 120 of switching to a smartphone registration mode, the ECU 120 transitions to the smartphone registration mode. In a case in which the ECU 120 transitions to the smartphone registration mode, smartphone pairing authentication is performed with the smartphone 160, and the electronic key 150 and the smartphone 160 are stored as a pair. When there are two users Y1 and Y2, pairing between the electronic key 150-1 and the smartphone 160-1 of the user Y1 is performed, and pairing between the electronic key 150-2 and the smartphone 160-2 of the user Y2 is performed.

Figure 20:
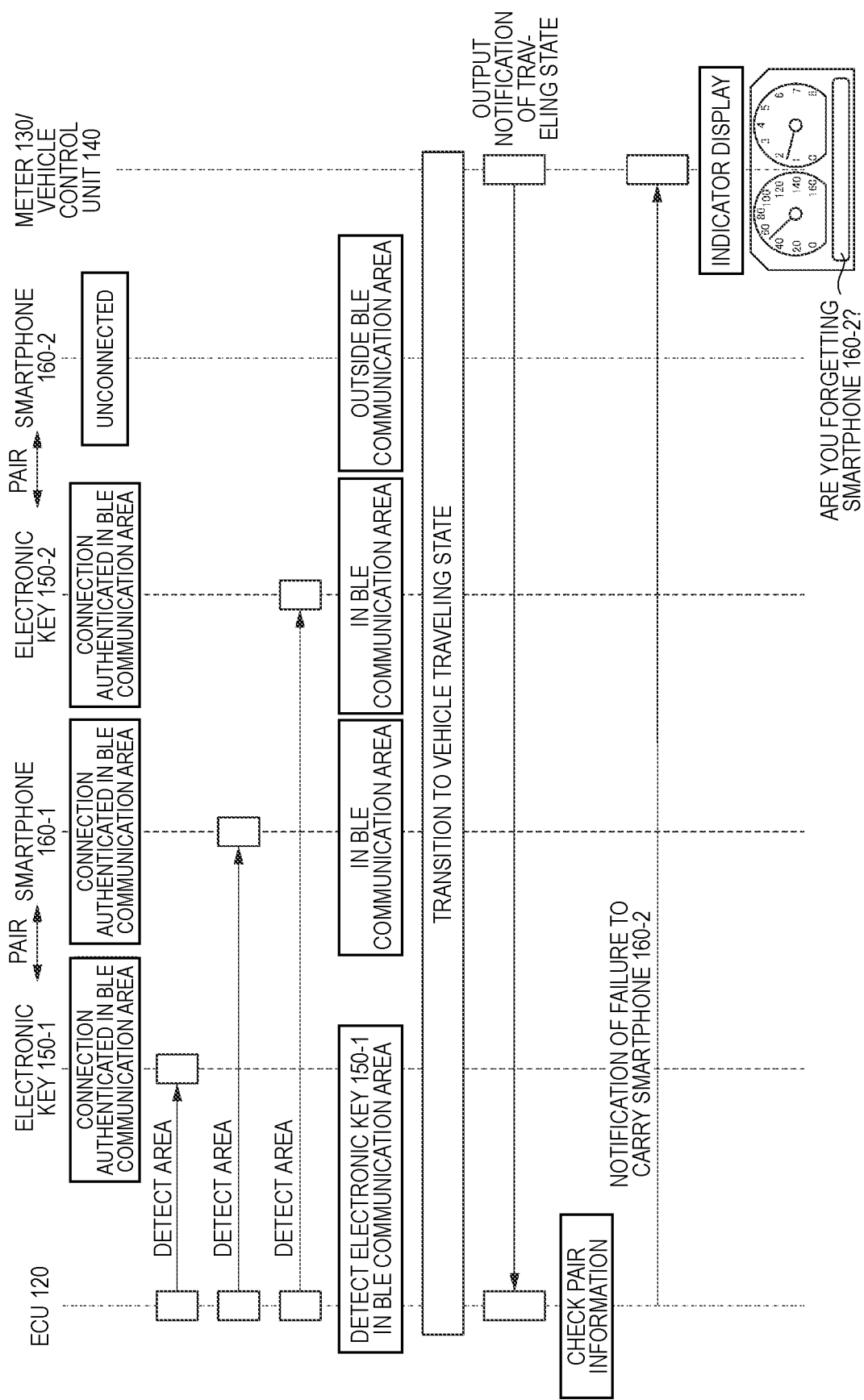
FIG. 20 is a sequence diagram showing operations of the ECU, the electronic key, the smartphone, the meter, and a vehicle control unit in the vehicle wireless communication system according to the third embodiment, in in a case in which there is a failure to carry the smartphone.

FIG. 20 is a sequence diagram showing operations of the ECU 120, the electronic keys 150-1 and 150-2, the smartphones 160-1 and 160-2, the meter 130, and the vehicle control unit 140 in the vehicle wireless communication system 100 according to the third embodiment, in a case in which the user Y2 fails to carry the smartphone 160-2. In the figure, the electronic key 150-1 and the smartphone 160-1 of the user Y1 are paired, and the electronic key 150-2 and the smartphone 160-2 of the user Y2 are paired. In a state where each of the electronic keys 150-1 and 150-2 and the smartphone 160-1 is in the BLE communication area 500 and connection authenticated, the ECU 120 performs the distance detection to detect an area where the electronic keys 150-1 and 150-2 and the smartphone 160-1 exist.

In a case in which the ECU 120 detects that the electronic key 150-1 is in the BLE communication area 500, detects that the smartphone 160-1 is in the BLE communication area 500, detects that the electronic key 150-2 is in the BLE communication area 500, and determines that the smartphone 160-2 is outside the BLE communication area 500, the ECU 120 transitions to the vehicle traveling state. After transitioning to the vehicle traveling state, the vehicle control unit 140 notifies the ECU 120 of a traveling state.

In response to reception of the notification of the traveling state, the ECU 120 refers to the storage unit 124 and checks the pair information. In this case, although the electronic key 150-2 and the smartphone 160-2 are paired, since the smartphone 160-2 is outside the BLE communication area 500, the ECU 120 notifies the meter 130 of a failure to carry the smartphone 160-2. Accordingly, a message "Are you forgetting a smartphone 160-2?" is displayed on the indicator 132 of the meter 130. The user Y2 viewing this display can recognize that the smartphone 160-2 is forgotten.

Figure 21:
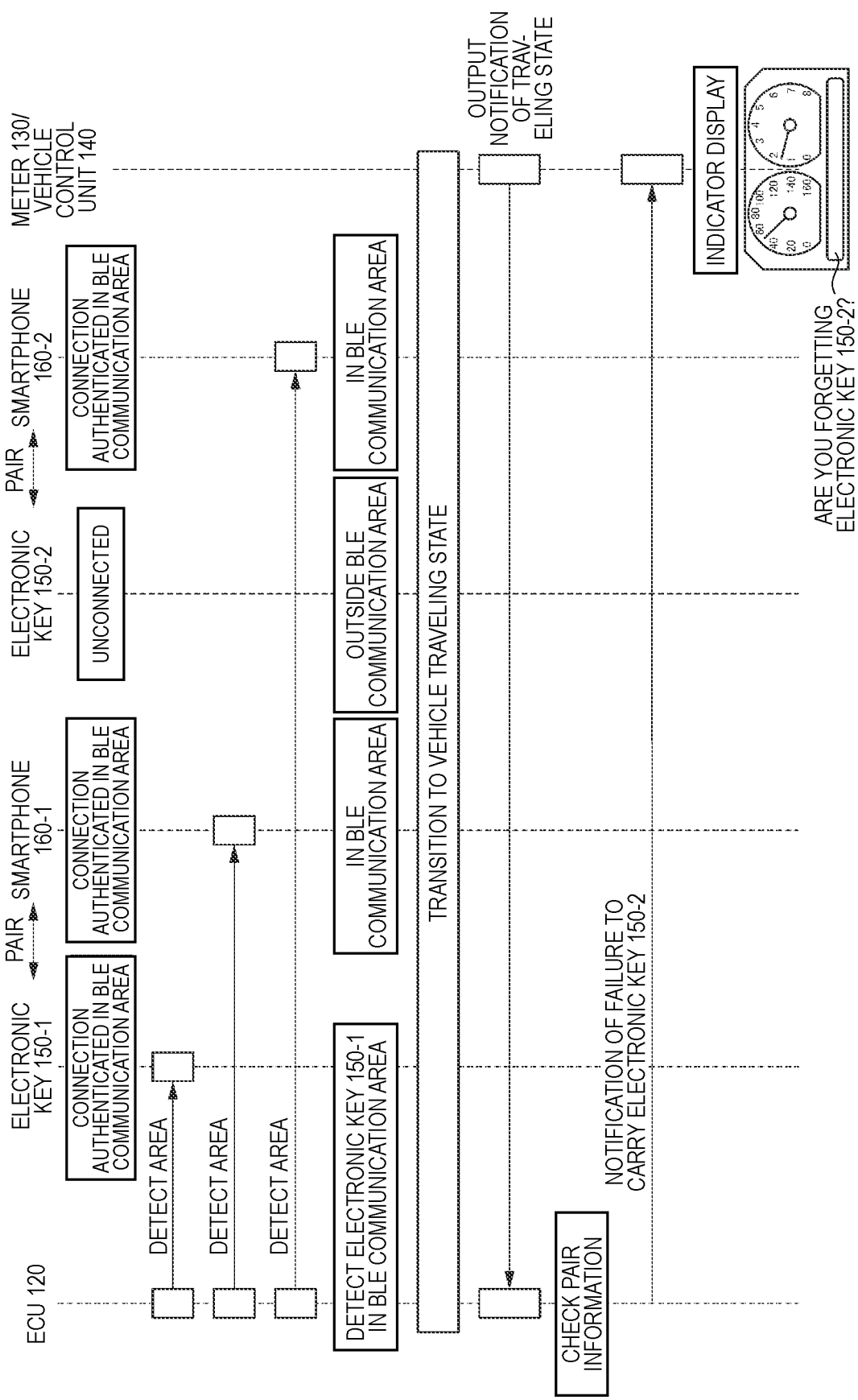
FIG. 21 is a sequence diagram showing operations of the ECU, the electronic key, the smartphone, the meter, and the vehicle control unit in the vehicle wireless communication system according to the third embodiment, in a case in which there is a failure to carry the electronic key.

FIG. 21 is a sequence diagram showing operations of the ECU 120, the electronic keys 150-1 and 150-2, the smartphones 160-1 and 160-2, the meter 130, and the vehicle control unit 140 in the vehicle wireless communication system 100 according to the third embodiment, in a case in which the user Y2 fails to carry the electronic key 150-2. In the figure, the electronic key 150-1 and the smartphone 160-1 of the user Y1 are paired, and the electronic key 150-2 and the smartphone 160-2 of the user Y2 are paired. In a state where each of the electronic key 150-1 and the smartphones 160-1 and 160-2 is in the BLE communication area 500 and connection authenticated, the ECU 120 performs the distance detection to detect an area where the electronic key 150-1 and the smartphones 160-1 and 160-2 exist.

In a case in which the ECU 120 detects that the electronic key 150-1 is in the BLE communication area 500, detects that the smartphone 160-1 is in the BLE communication area 500, determines that the electronic key 150-2 is outside the BLE communication area 500, and determines that the smartphone 160-2 is in the BLE communication area 500, the ECU 120 transitions to the vehicle traveling state. After transitioning to the vehicle traveling state, the vehicle control unit 140 notifies the ECU 120 of the traveling state.

In response to reception of the notification of the traveling state, the ECU 120 refers to the storage unit 124 and checks the pair information. In this case, although the electronic key 150-2 and the smartphone 160-2 are paired, since the electronic key 150-2 is outside the BLE communication area 500, the ECU 120 notifies the meter 130 of a failure to carry the electronic key 150-2. Accordingly, a message "Are you forgetting an electronic key 150-2?" is displayed on the indicator 132 of the meter 130. The user Y2 viewing this display can recognize a failure to carry the electronic key 150-2.

Figure 22A:
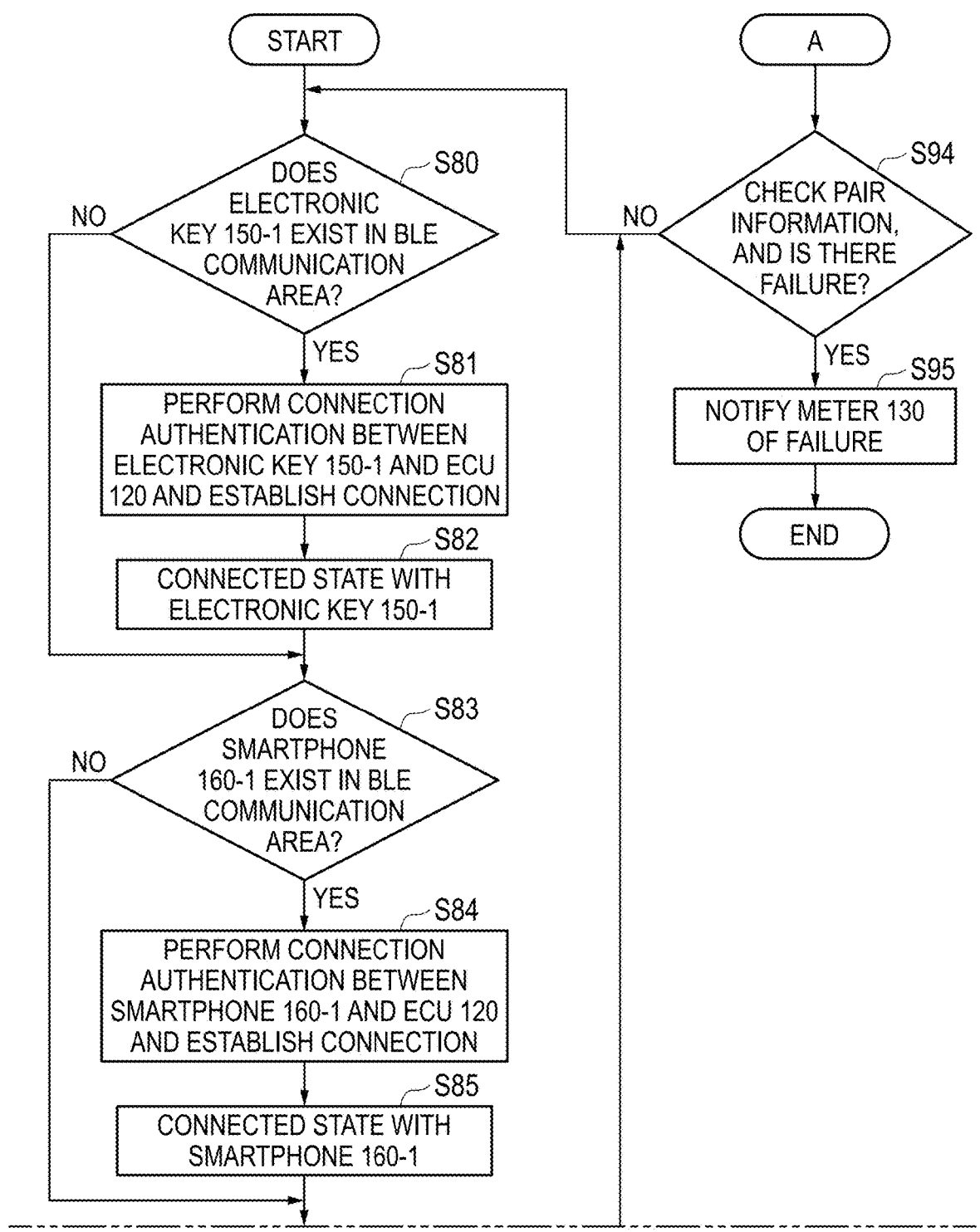
FIGS. 22A and 22B are a flowchart showing an operation of the ECU in the vehicle wireless communication system according to the third embodiment, in a case in which a determination of a failure to carry a carry-on item is performed while the vehicle is traveling.
Figure 22B:
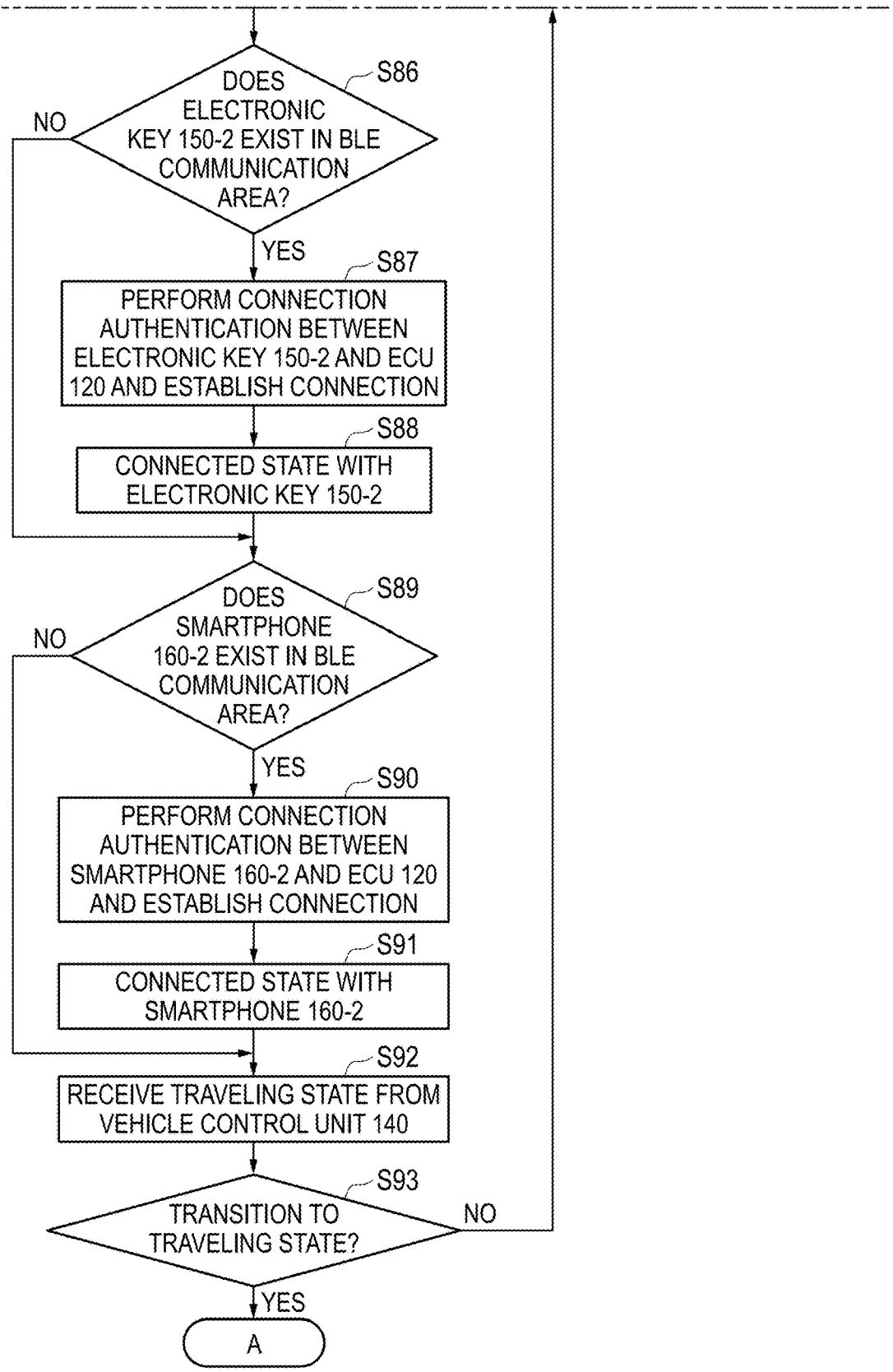

FIGS. 22A and B are a flowchart showing an operation of the ECU 120 in the vehicle wireless communication system 100 according to the third embodiment, in a case in which a determination of a failure to carry the carry-on item is performed while the vehicle 110 is traveling. In the figures, first, the ECU 120 determines whether the electronic key 150-1 exists in the BLE communication area 500 (step S80). If the ECU 120 determines that the electronic key 150-1 exists in the BLE communication area 500 (if it is determined as "YES" in step S80), the ECU 120 performs connection authentication with the electronic key 150-1 (step S81), and establishes a connected state with the electronic key 150-1 (step S82). The ECU 120 determines whether the smartphone 160-1 exists in the BLE communication area 500 (step S83). If it is determined in step S80 that the electronic key 150-1 does not exist in the BLE communication area 500 (if it is determined as "NO"), the process proceeds to step S83.

If the ECU 120 determines that the smartphone 160-1 exists in the BLE communication area 500 in step S83 (if it is determined as "YES"), the ECU 120 performs connection authentication with the smartphone 160-1 (step S84), and establishes a connected state with the smartphone 160-1 (step S85). The ECU 120 determines whether the electronic key 150-2 exists in the BLE communication area 500 (step S86). If it is determined in step S83 that the smartphone 160-1 does not exist in the BLE communication area 500 (if it is determined as "NO"), the process proceeds to step S86.

If it is determined in step S86 that the electronic key 150-2 exists in the BLE communication area 500 (if it is determined as "YES"), connection authentication is performed with the electronic key 150-2 (step S87), and a connected state with the electronic key 150-2 is established (step S88). Next, the ECU 120 determines whether the smartphone 160-2 exists in the BLE communication area 500 (step S89). If it is determined in step S86 that the electronic key 150-2 does not exist in the BLE communication area 500 (if it is determined as "NO"), the process proceeds to step S89.

If it is determined in step S89 that the smartphone 160-2 exists in the BLE communication area 500 (if it is determined as "YES"), connection authentication is performed with the smartphone 160-2 (step S90), and a connected state with the smartphone 160-2 is established (step S91). Next, the ECU 120 receives the traveling state of the vehicle 110 from the vehicle control unit 140 (step S92), and determines whether the vehicle 110 transitions to the traveling state (step S93). If the ECU 120 determines that the vehicle 110 does not transition to the traveling state (if it is determined as "NO" in step S93), the process returns to the first step S80. In contrast, if it is determined that the vehicle 110 transitions to the traveling state (if it is determined as "YES" in step S93), the pair information stored in the storage unit 124 is checked to determine whether there is a failure (step S94). If the ECU 120 determines that there is no failure (if it is determined as "NO" in step S94), the process returns to the first step S80, and if the ECU 120 determines that there is a failure (if it is determined as "YES" in step S94), the ECU 120 notifies the meter 130 of the failure (step S95). After notifying the meter 130 of the failure by the ECU 120, the present process is ended.

Figure 23:
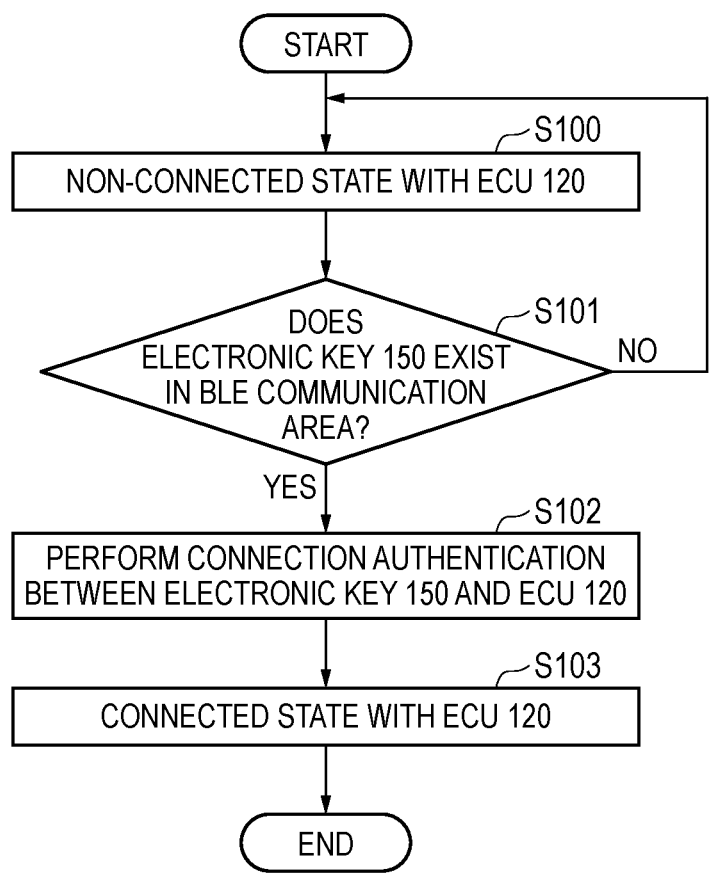
FIG. 23 is a flowchart showing an operation at the time of connection authentication of the electronic key of the vehicle wireless communication system according to the third embodiment.

FIG. 23 is a flowchart showing an operation at the time of connection authentication of the electronic key 150 of the vehicle wireless communication system 100 according to the third embodiment. In the figure, the control unit 156 of the electronic key 150 recognizes that the electronic key 150 is in a non-connected state with the ECU 120 (step S100), and determines whether the electronic key 150 exists in the BLE communication area 500 in this state (step S101). If the control unit 156 determines that the electronic key 150 does not exist in the BLE communication area 500 (if it is determined as "NO" in step S101), the process returns to step S100. In contrast, if it is determined that the electronic key 150 exists in the BLE communication area 500 (if it is determined as "YES" in step S101), the connection authentication is performed with the ECU 120 (step S102), and after recognizing that the electronic key 150 is in the connected state with the ECU 120 (step S103), the present process is ended. The similar applies to an operation of the smartphone 160 at the time of the connection authentication.

As described above, in the vehicle wireless communication system 100 of the third embodiment, the pair information obtained by pairing the electronic key 150 and the smartphone 160 is stored. In that state, in a case in which the electronic key 150 is positioned in the vehicle use permission area 504 including one point located inside the vehicle 110, the user of the vehicle 110 is permitted. In a case in which the electronic key 150 is positioned in the BLE communication area 500 including one point located inside the vehicle 110, the smartphone 160 is not positioned in the third area including one point located inside the vehicle 110 and the vehicle 110 is in a traveling state, the indicator 132 of the meter 130 displays a notification that there is a possibility of a failure to carry the smartphone 160. In a case in which the electronic key 150 is positioned in the BLE communication area 500 and the smartphone 160 is positioned in the third area, the indicator 132 of the meter 130 does not display the notification that there is a possibility of a failure to carry the smartphone 160. Consequently, it possible to prevent a failure to carry the smartphone 160.

In the case of a failure to carry the electronic key 150, the smartphone 160 is replaced with the electronic key 150 in the above description.

In the determination that there is a possibility of a failure to carry the smartphone 160, the condition that the vehicle 110 is in the traveling state may be excluded.

Fourth Embodiment

Next, a vehicle wireless communication system according to a fourth embodiment will be described. Since a configuration of the vehicle wireless communication system of the fourth embodiment is common to the vehicle wireless communication system 100 of the third embodiment of FIG. 12, FIG. 12 will be referred to. However, since an ECU of the vehicle wireless communication system of the fourth embodiment has some functions different from the ECU 120 of the vehicle wireless communication system 100 of the third embodiment, a reference sign 127 is given to the ECU of the vehicle wireless communication system of the fourth embodiment. A reference sign 101 is given to the vehicle wireless communication system of the fourth embodiment.

A difference between the vehicle wireless communication system 101 of the fourth embodiment and the vehicle wireless communication system 100 of the third embodiment is that the vehicle wireless communication system 100 of the third embodiment performs the detection of the electronic key 150 and the smartphone 160 while the vehicle is travelling, whereas the vehicle wireless communication system 101 of the fourth embodiment performs the detection of the electronic key 150 and the smartphone 160 in a case in which the power supply of the vehicle is ON. Other processing is the same. The detection of the electronic key 150 and the smartphone 160 in a case in which the power supply of the vehicle is ON means that the detection is performed in the vehicle use permission area.

Figure 24:
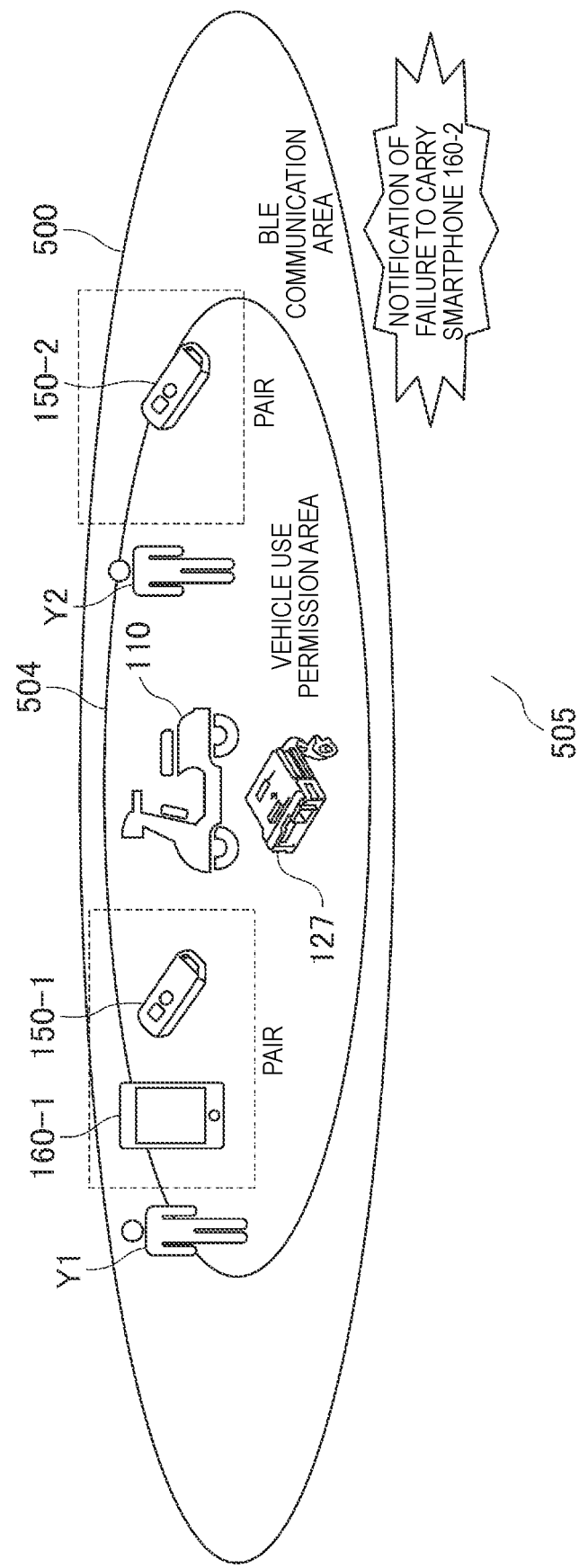
FIG. 24 is a diagram showing a processing of an ECU in a vehicle wireless communication system according to a fourth embodiment, in a case in which there is a failure to carry the smartphone.

FIG. 24 is a diagram showing a processing in a case in which the user Y2 fails to carry the smartphone 160-2. As shown in the figure, the user Y1 carries the electronic key 150-1 and the smartphone 160-1, and the user Y2 carries the electronic key 150-2 but fails to carry the smartphone 160-2. The electronic key 150-1 and the smartphone 160-1 of the user Y1 are registered as a pair, and the electronic key 150-2 and the smartphone 160-2 of the user Y2 are also registered as a pair. The ECU 127 detects the electronic key 150 in the vicinity of the vehicle 110 when the power supply of the vehicle 110 is ON. In a case in which the smartphone 160 associated with all the detected electronic keys 150 cannot be detected in the vicinity of the vehicle 110, the ECU 127 notifies the meter 130 of a failure to carry the smartphone 160. At this time, since there is a failure to carry the smartphone 160-2 of the user Y2, the meter 130 is notified of the failure to carry the smartphone 160-2. In order to detect the electronic key 150 when the power supply of the vehicle is ON, the electronic keys 150-1 and 150-2 should exist in the vehicle use permission area 504. This is because the power supply of the vehicle cannot be ON unless the electronic keys 150-1 and 150-2 are positioned in the vehicle use permission area 504.

Figure 25:
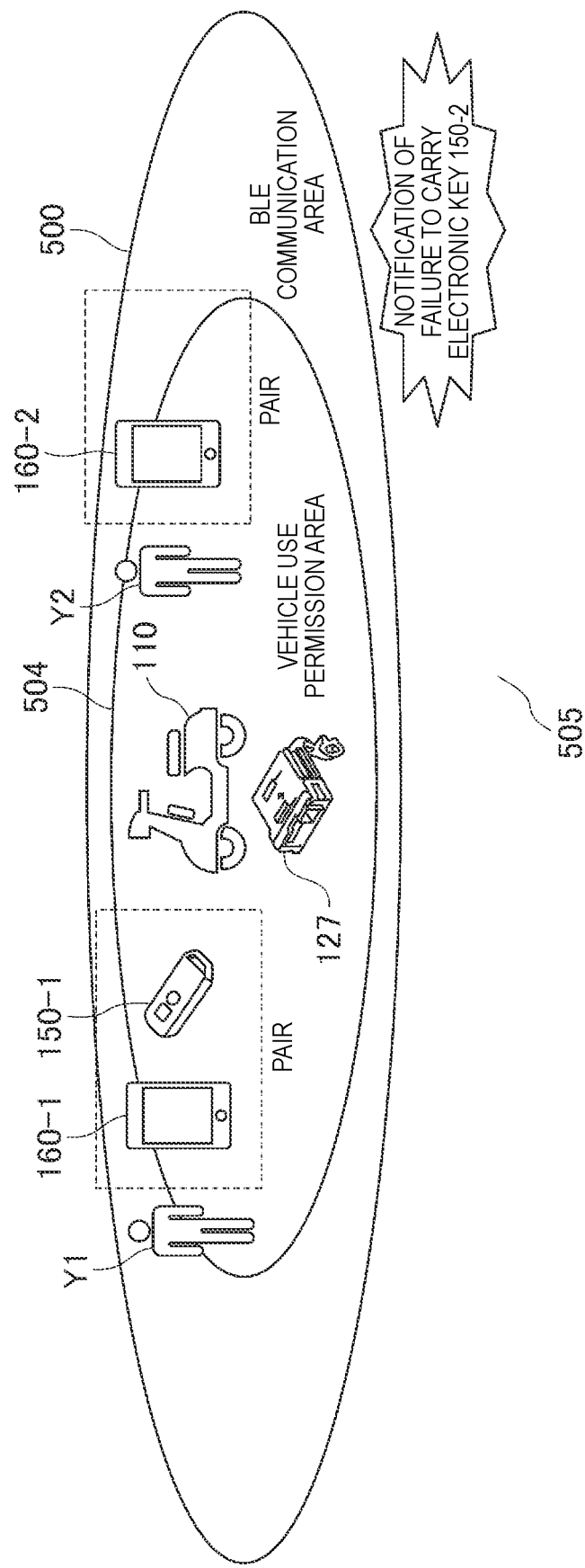
FIG. 25 is a diagram showing a processing of the ECU in the vehicle wireless communication system according to the fourth embodiment, in a case in which there is a failure to carry the electronic key.

The example shown in FIG. 24 is a case where the user Y2 fails to carry the smartphone 160-2. In another case in which the user Y2 fails to carry the electronic key 150-2, the following operation is performed. FIG. 25 is a diagram showing a processing in a case in which the user Y2 fails to carry the electronic key 150-2. As shown in the figure, in a state in which the electronic key 150-1 exists in the vehicle use permission area 504, the ECU 127 detects all the smartphones 160 existing in the vicinity of the vehicle 110. In a case in which the electronic keys 150 associated with all the detected smartphones 160 cannot be detected in the vicinity of the vehicle 110, the ECU 127 notifies the meter 130 of a failure to carry the electronic key 150. At this time, since there is a failure to carry the electronic key 150-2 of the user Y2, the meter 130 is notified of the failure to carry the electronic key 150-2.

The notification of a failure to carry the electronic key 150 or the smartphone 160 can be performed even when three or more passengers get on the vehicle 110. However, since the vehicle wireless communication system 101 according to the fourth embodiment is applied to the vehicle 110 of two wheels, only two people can get on the vehicle 110, but when the vehicle wireless communication system 101 is applied to a vehicle (not shown) of four wheels, it is possible to notify three or more passengers of a failure to carry the electronic key 150 and the smartphone 160.

Figure 26:
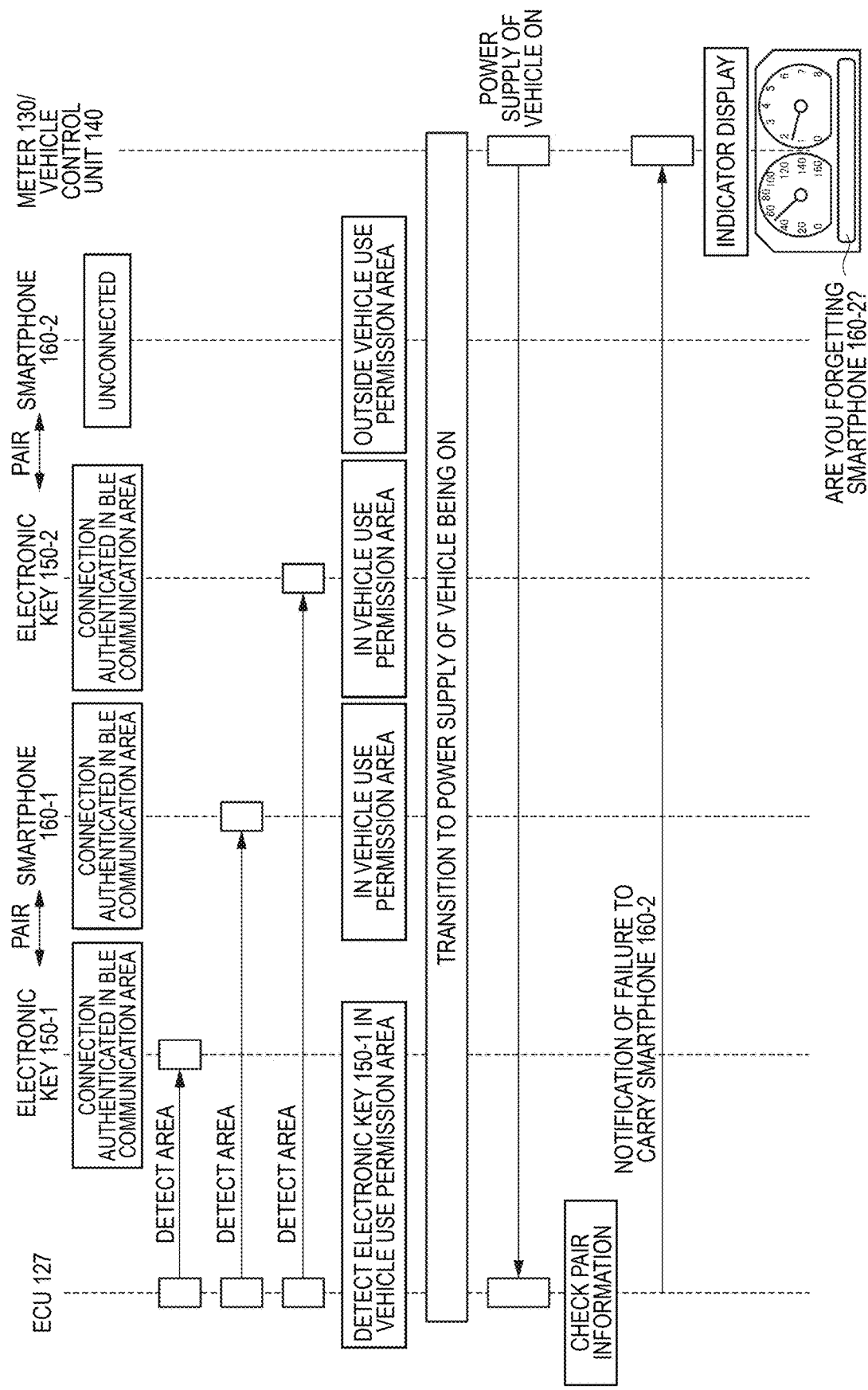
FIG. 26 is a sequence diagram showing operations of the ECU, the electronic key, the smartphone, the meter, and the vehicle control unit in the vehicle wireless communication system according to the fourth embodiment, in a case in which there is a failure to carry the smartphone.

Next, operations of the ECU 127, the electronic key 150, and the smartphone 160 in the vehicle wireless communication system 101 of the fourth embodiment will be described with reference to a sequence diagram and a flowchart. FIG. 26 is a sequence diagram showing operations of the ECU 127, the electronic keys 150-1 and 150-2, the smartphones 160-1 and 160-2, the meter 130, and the vehicle control unit 140 in the vehicle wireless communication system 101 according to the fourth embodiment, in a case in which the user Y2 fails to carry the smartphone 160-2. In the figure, the electronic key 150-1 and the smartphone 160-1 of the user Y1 are paired, and the electronic key 150-2 and the smartphone 160-2 of the user Y2 are paired. In a state where each of the electronic keys 150-1 and 150-2 and the smartphone 160-1 is in the BLE communication area 500 and connection authenticated, the ECU 127 performs the distance detection to detect an area where the electronic keys 150-1 and 150-2 and the smartphone 160-1 exist.

In a case in which the ECU 127 detects that the electronic key 150-1 is in the vehicle use permission area 504, detects that the smartphone 160-1 is in the vehicle use permission area 504, detects that the electronic key 150-2 is in the vehicle use permission area 504, and determines that the smartphone 160-2 is outside the vehicle use permission area 504, a state of the power supply of the vehicle transitions to ON. After the state of the power supply of the vehicle transitions to ON, the vehicle control unit 140 notifies the ECU 127 of the power supply of the vehicle being ON.

In response to reception of the notification of the power supply of the vehicle being ON, the ECU 127 checks the pair information in the storage unit 124. In this case, although the electronic key 150-2 and the smartphone 160-2 are paired, since the smartphone 160-2 is outside the vehicle use permission area 504, the ECU 127 notifies the meter 130 of a failure to carry the smartphone 160-2. Accordingly, a message "Are you forgetting a smartphone 160-2?" is displayed on the indicator 132 of the meter 130. The user Y2 viewing this display recognizes a failure to carry the smartphone 160-2.

Figure 27:
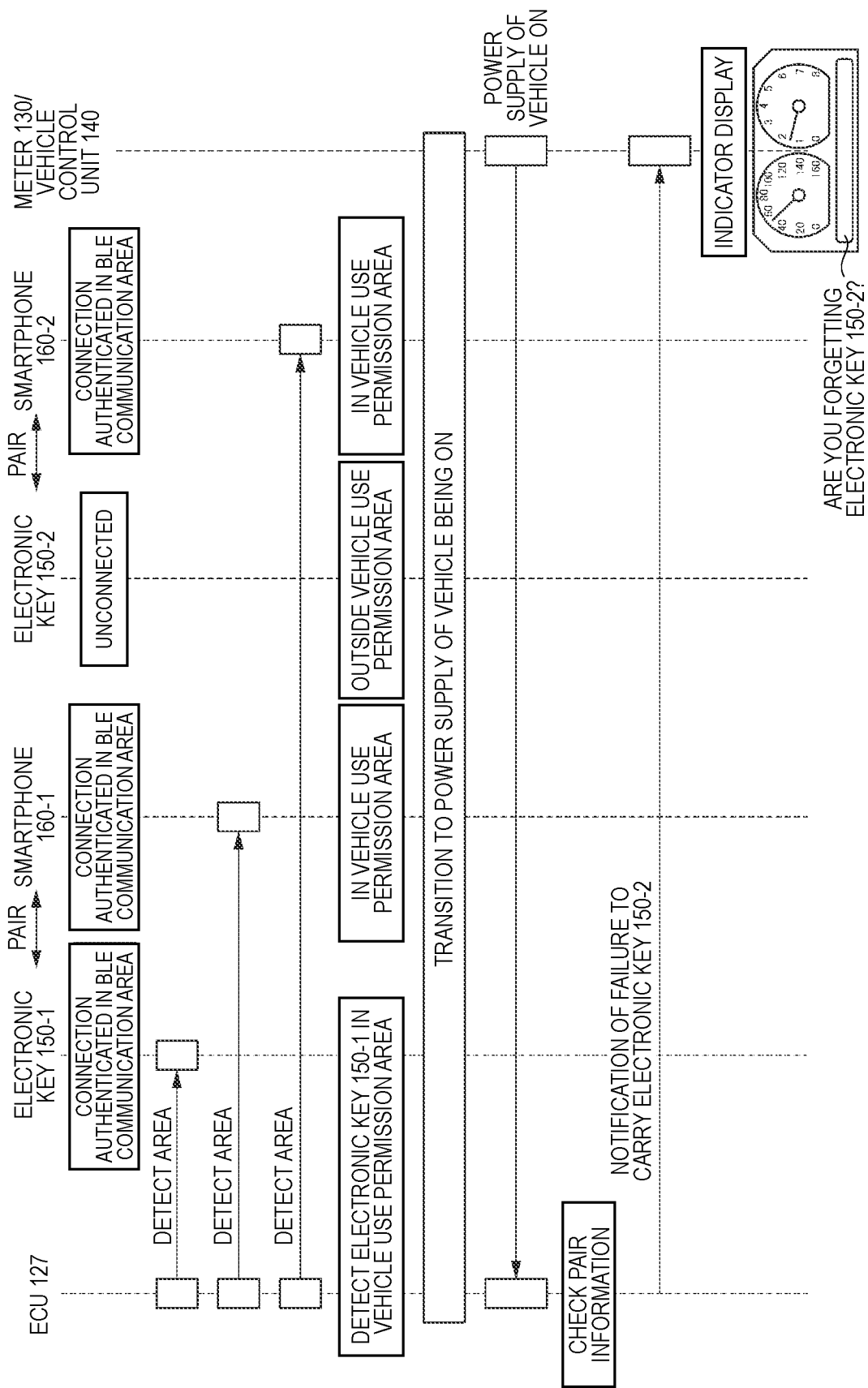
FIG. 27 is a sequence diagram showing operations of the ECU, the electronic key, the smartphone, the meter, and the vehicle control unit in the vehicle wireless communication system according to the fourth embodiment, in a case in which there is a failure to carry the electronic key.

FIG. 27 is a sequence diagram showing operations of the ECU 127, the electronic keys 150-1 and 150-2, the smartphones 160-1 and 160-2, the meter 130, and the vehicle control unit 140 in the vehicle wireless communication system 101 according to the fourth embodiment, in a case in which the user Y2 fails to carry the electronic key 150-2. In the figure, the electronic key 150-1 and the smartphone 160-1 of the user Y1 are paired, and the electronic key 150-2 and the smartphone 160-2 of the user Y2 are paired. In a state where each of the electronic key 150-1 and the smartphones 160-1 and 160-2 is in the BLE communication area 500 and connection authenticated, the ECU 127 performs the distance detection to detect an area where the electronic key 150-1 and the smartphones 160-1 and 160-2 exist.

In a case in which the ECU 127 detects that the electronic key 150-1 is in the vehicle use permission area 504, detects that the smartphone 160-1 is in the vehicle use permission area 504, determines that the electronic key 150-2 is outside the vehicle use permission area 504, and determines that the smartphone 160-2 is in the vehicle use permission area 504, a state of the power supply of the vehicle transitions to ON. After the state of the power supply of the vehicle transitions to ON, the vehicle control unit 140 notifies the ECU 127 of the power supply of the vehicle being ON.

In response to reception of the notification of the power supply of the vehicle being ON, the ECU 127 checks the pair information in the storage unit 124. In this case, although the electronic key 150-2 and the smartphone 160-2 are paired, since the electronic key 150-2 is outside the vehicle use permission area 504, the ECU 127 notifies the meter 130 of a failure to carry the electronic key 150-2. Accordingly, a message "Are you forgetting an electronic key 150-2?" is displayed on the indicator 132 of the meter 130. The user Y2 viewing this display recognizes a failure to carry the electronic key 150-2.

Figure 28A:
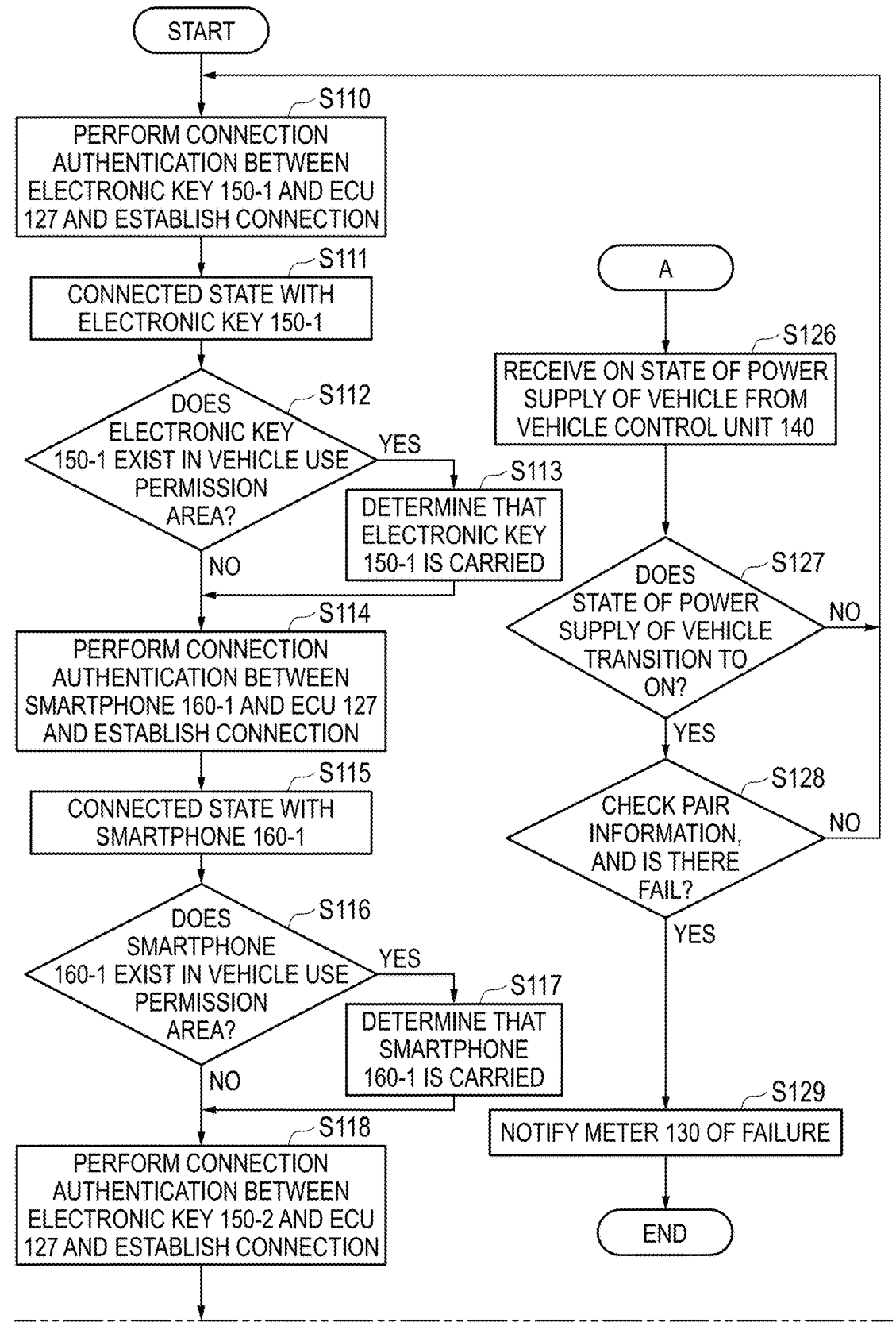
Figure 28B:
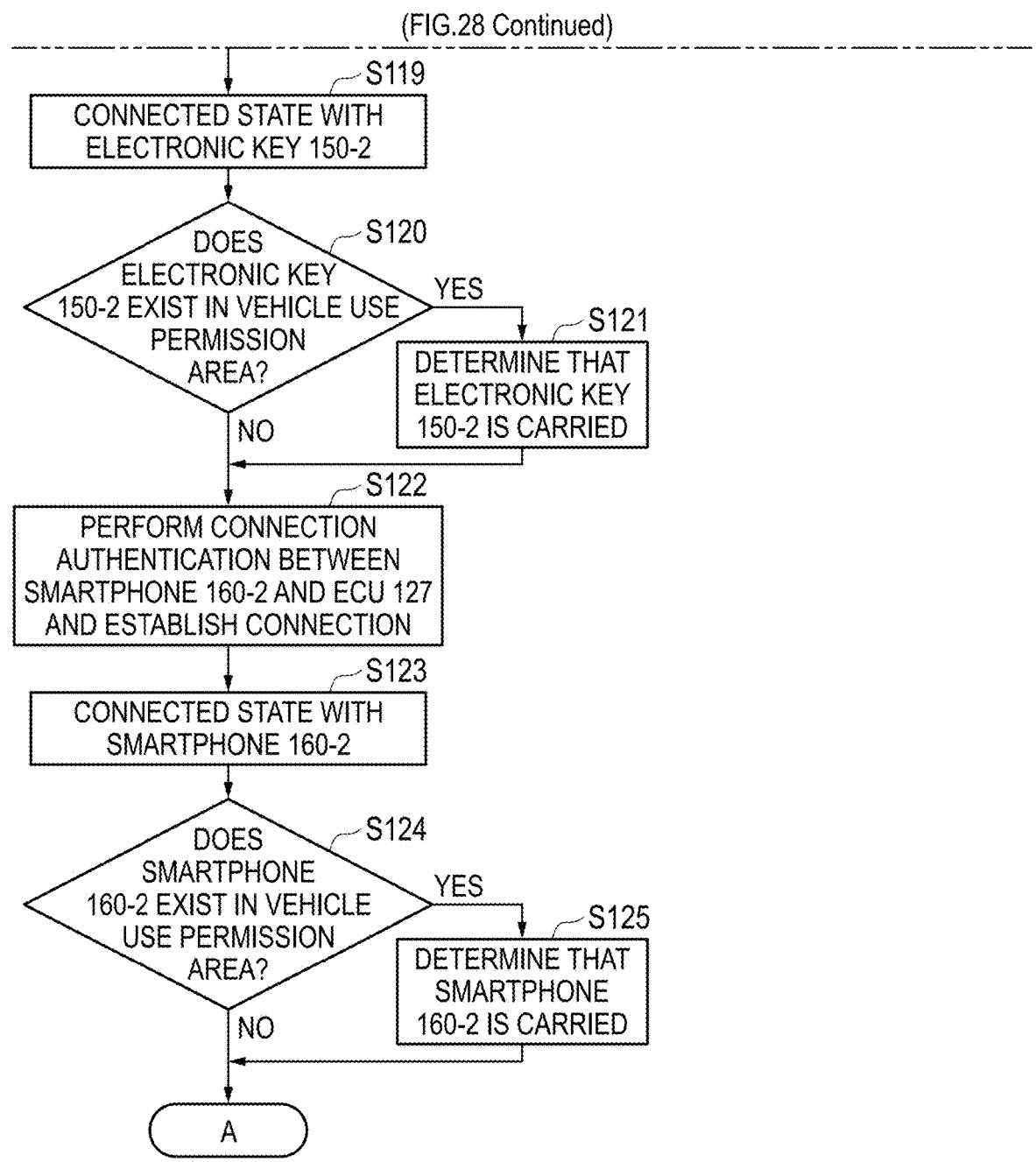

FIGS. 28A adn 28B are a flowchart showing an operation of the ECU 127 in the vehicle wireless communication system 101 according to the fourth embodiment, in a case in which a determination of a failure to carry the carry-on item is performed while the power supply of the vehicle is ON. In the figures, first, the ECU 127 performs connection authentication with the electronic key 150-1 and connects to the electronic key 150-1 (step S110). Then, it is recognized that the electronic key 150-1 is in the connected state (step S111), and in this state, it is determined whether the electronic key 150-1 exists in the vehicle use permission area 504 (step S112). If it is determined that the electronic key 150-1 exists in the vehicle use permission area 504 (if it is determined as "YES" in step S112), the ECU 127 determines that the electronic key 150-1 is carried (step S113). In contrast, if it is determined that the electronic key 150-1 does not exist in the vehicle use permission area 504 (if it is determined as "NO" in step S112), the ECU 127 performs connection authentication with the smartphone 160-1 and connects to the smartphone 160-1 (step S114). After it is determined in step S113 that the electronic key 150-1 is carried, the process proceeds to step S114, and connection authentication is performed with the smartphone 160-1 and the connection to the smartphone 160-1 is performed.

After performing the connection authentication with the smartphone 160-1 and performing connection to the smartphone 160-1 in step S114, the ECU 127 recognizes that the smartphone 160-1 is in the connected state (step S115), and determines whether the smartphone 160-1 exists in the vehicle use permission area 504 in this state (step S116). If the ECU 127 determines that the smartphone 160-1 exists in the vehicle use permission area 504 (if it is determined as "YES" in step S116), the ECU 127 determines that the smartphone 160-1 is carried (step S117). In contrast, if the ECU 127 determines that the smartphone 160-1 does not exist in the vehicle use permission area 504 (if it is determined as "NO" in step S116), the ECU 127 performs connection authentication with the electronic key 150-2 and connects to the electronic key 150-2 (step S118). After it is determined in step S117 that the smartphone 160-1 is carried, the process proceeds to step S118, and connection authentication is performed with the electronic key 150-2 and the connection to the electronic key 150-2 is performed.

After performing the connection authentication with the electronic key 150-2 and performing connection to the electronic key 150-2 in step S118, the ECU 127 recognizes that the electronic key 150-2 is in the connected state (step S119), and determines whether the electronic key 150-2 exists in the vehicle use permission area 504 in this state (step S120). If it is determined that the electronic key 150-2 exists in the vehicle use permission area 504 (if it is determined as "YES" in step S120), the ECU 127 determines that the electronic key 150-2 is carried (step S121). In contrast, if it is determined that the electronic key 150-2 does not exist in the vehicle use permission area 504 (if it is determined as "NO" in step S120), the ECU 127 performs connection authentication with the smartphone 160-2 and connects to the smartphone 160-2 (step S122). After it is determined in step S121 that the electronic key 150-2 is carried, the process proceeds to step S122, and connection authentication is performed with the smartphone 160-2 and the connection to the smartphone 160-2 is performed.

After performing the connection authentication with the smartphone 160-2 and performing connection to the smartphone 160-2 in step S122, the ECU 127 recognizes that the smartphone 160-2 is in the connected state (step S123), and determines whether the smartphone 160-2 exists in the vehicle use permission area 504 in this state (step S124). If the ECU 127 determines that the smartphone 160-2 exists in the vehicle use permission area 504 (if it is determined as "YES" in step S124), the ECU 127 determines that the smartphone 160-2 is carried (step S125). In contrast, if the ECU 127 determines that the smartphone 160-2 does not exist in the vehicle use permission area 504 (if it is determined as "NO" in step S124), the ECU 127 receives a state of the power supply of the vehicle being ON from the vehicle control unit 140 (step S126).

In response to reception of the state of the power supply of the vehicle power being ON, the ECU 127 determines whether the state of the power supply of the vehicle should transition to ON (step S127), and if it is determined that the state of the power supply of the vehicle should not transition to ON (if it is determined as "NO" in step S127), the process returns to the first step S110. In contrast, if it is determined that the state of the power supply of the vehicle should transition to ON (if it is determined as "YES" in step S127), the pair information stored in the storage unit 124 is checked to determine whether there is a failure (step S128). If the ECU 127 determines that there is no failure (if it is determined as "NO" in step S128), the process returns to the first step S110, and if the ECU 127 determines that there is a failure (if it is determined as "YES" in step S128), the ECU 127 notifies the meter 130 of the failure (step S129). After notifying the meter 130 of the failure by the ECU 127, the present process is ended.

Figure 29:
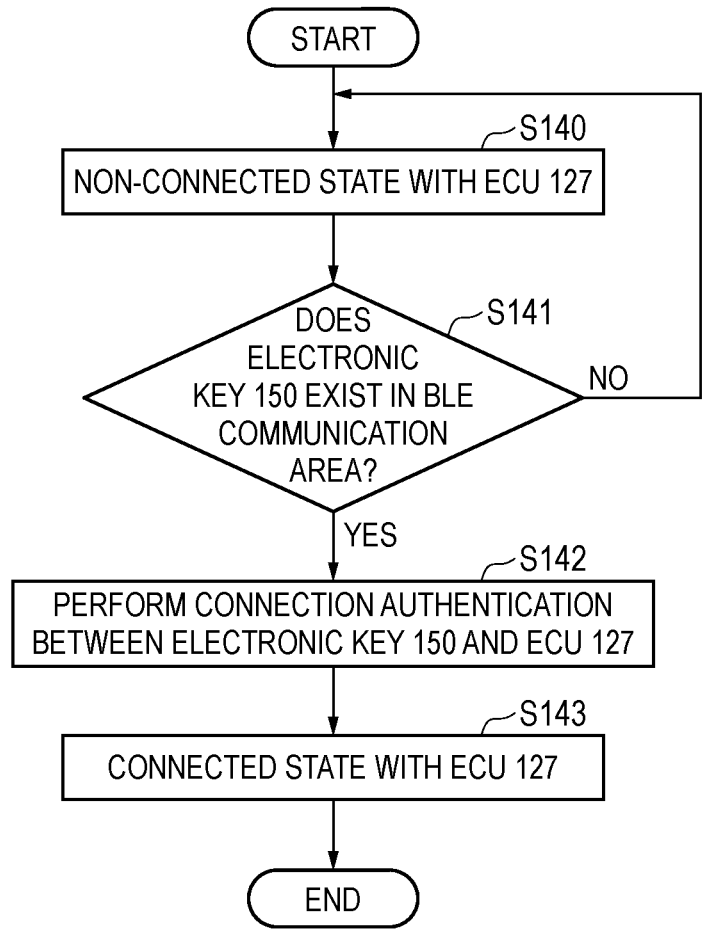
FIG. 29 is a flowchart showing an operation at the time of connection authentication of the electronic key of the vehicle wireless communication system according to the fourth embodiment.
Figure 30:
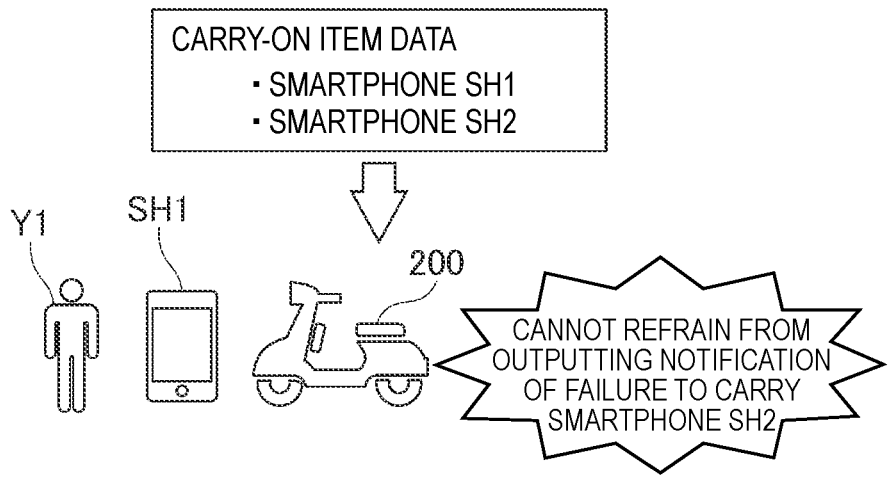
FIG. 30 is a diagram showing a problem when two smartphones are registered as carry-on item data and one user carries a smartphone and gets on a vehicle.
Figure 31:
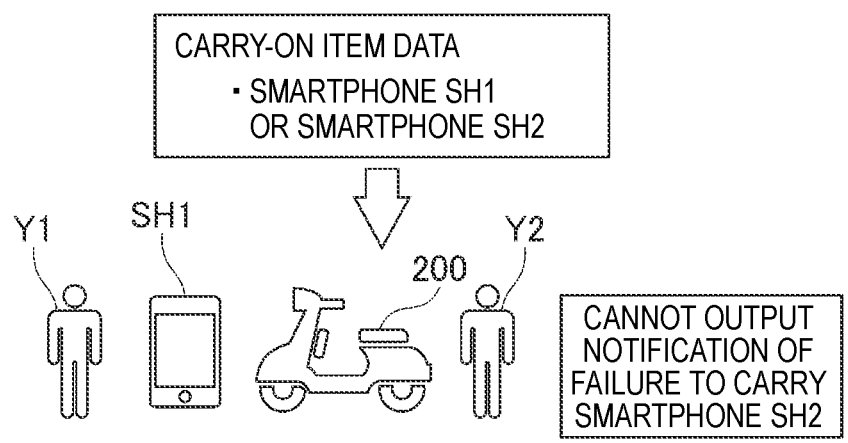
FIG. 31 is a diagram showing a problem when a smartphone is registered as the carry-on item data and one user gets on the vehicle without carrying a smartphone.

FIG. 29 is a flowchart showing an operation at the time of connection authentication of the electronic key 150 of the vehicle wireless communication system 101 according to the fourth embodiment. In the figure, the control unit 156 of the electronic key 150 recognizes that the electronic key 150 is in a non-connected state with the ECU 127 (step S140), and determines whether the electronic key 150 exists in the BLE communication area 500 in this state (step S141). If it is determined that the electronic key 150 does not exist in the BLE communication area 500 (if it is determined as "NO" in step S141), the process returns to step S140. In contrast, if it is determined that the electronic key 150 exists in the BLE communication area 500 (if it is determined as "YES" in step S141), the connection authentication is performed with the ECU 127 (step S142), and after recognizing that the electronic key 150 is in the connected state with the ECU 127 (step S143), the present process is ended. The similar applies to an operation of the smartphone 160 at the time of the connection authentication.

As described above, in the vehicle wireless communication system 101 of the fourth embodiment, the pair information obtained by pairing the electronic key 150 and the smartphone 160 is stored. In that state, in a case in which the electronic key 150 has entered the vehicle use permission area 504 including one point located inside the vehicle 110, the use of the vehicle 110 is permitted. In a case in which the electronic key 150 is positioned in the vehicle use permission area 504 including one point located inside the vehicle 110, the smartphone 160 is not positioned in the vehicle use permission area 504 including one point located inside the vehicle 110 and the power supply of the vehicle is ON, the indicator 132 of the meter 130 displays a notification that there is a possibility of a failure to carry the smartphone 160. In a case in which the electronic key 150 is positioned in the vehicle use permission area 504 and the smartphone 160 is positioned in the vehicle use permission area 504, the indicator 132 of the meter 130 does not display the notification that there is a possibility of a failure to carry the smartphone 160. Consequently, it possible to prevent a failure to carry the smartphone 160.

In the case of a failure to carry the electronic key 150, the above smartphone 160 is replaced with the electronic key 150.

Although the present invention has been described in detail with reference to the specific embodiments, it will be apparent to those skilled in the art that various changes and modifications can be made without departing from the spirit and scope of the present invention.

A vehicle wireless communication system according to the present disclosure includes: a vehicle including an output circuit; a first communication device configured to wirelessly communicate with the vehicle; and a second communication device configured to wirelessly communicate with the vehicle, in which in a case in which the first communication device is positioned in a first area including one point located inside the vehicle, the user of the vehicle is permitted, in a case in which the first communication device is positioned in a second area including the one point located inside the vehicle and the second communication device is not positioned in a third area including the one point located inside the vehicle, the output circuit of the vehicle outputs a notification that there is a possibility of a failure to carry the second communication device, and in a case in which the first communication device is positioned in the second area and the second communication device is positioned in the third area, the output circuit of the vehicle does not output the notification that there is a possibility of a failure to carry the second communication device.

According to the present disclosure, in a case in which the first communication device (for example, an electronic key) is positioned in the first area including one point located inside the vehicle, the use of the vehicle is permitted, and in a case in which the first communication device is positioned in the second area including one point located inside the vehicle and the second communication device (for example, a smartphone) is not positioned in the third area including one point located inside the vehicle, it is notified that there is a possibility of a failure to carry the second communication device, and thus a failure to carry the second communication device can be prevented.

In the vehicle wireless communication system according to the present disclosure, in the above configuration, the first communication device is an electronic key, and the second communication device is an information display terminal including at least a display circuit configured to display an image.

According to the present disclosure, in a case in which the electronic key as the first communication device is positioned in the second area including one point located inside the vehicle and the information display terminal as the second communication device is not positioned in the third area including one point located inside the vehicle, it is notified that there is a possibility of a failure to carry the information display terminal, and thus a failure to carry the information display terminal can be prevented.

In the vehicle wireless communication system according to the present disclosure, in the above configuration, the first communication device is an information display terminal including at least a display circuit configured to display an image, and the second communication device is an electronic key.

According to the present disclosure, in a case in which the information display terminal as the first communication device is positioned in the second area including one point located inside the vehicle and the electronic key as the second communication device is not positioned in the third area including one point located inside the vehicle, it is notified that there is a possibility of a failure to carry the electronic key, and thus a failure to carry the electronic key can be prevented.

In the vehicle wireless communication system according to the present disclosure, in the above configuration, the vehicle is configured to store the first communication device and the second communication device in association with each other.

According to the present disclosure, in a case in which one communication device is positioned in the second area and the other communication device stored in association with the one communication device is not positioned in the third region, it is notified that the other communication device cannot be detected, so that a failure to carry the other communication device can be prevented.

In the vehicle wireless communication system according to the present disclosure, in the above configuration, the first area and the second area are the same.

According to the present disclosure, in a case in which the first communication device is positioned in the first area including one point located inside the vehicle and the second communication device is not positioned in the third area including one point located inside the vehicle, it is notified that there is a possibility of a failure to carry the second communication device, and thus a failure to carry the second communication device can be prevented.

In the vehicle wireless communication system according to the present disclosure, in the above configuration, the second area and the third area are the same.

According to the present disclosure, in a case in which the first communication device is positioned in the first area including one point located inside the vehicle and the second communication device is not positioned in the second area including one point located inside the vehicle, it is notified that there is a possibility of a failure to carry the second communication device, and thus a failure to carry the second communication device can be prevented.

In the vehicle wireless communication system according to the present disclosure, in the above configuration, when the first communication device is positioned in the second area, the second communication device is not positioned in the third area and the vehicle is in a traveling state, the output circuit of the vehicle outputs the notification that there is a possibility of a failure to carry the second communication device.

According to the present disclosure, in a case in which the first communication device is positioned in the second area, the second communication device is not positioned in the third area and the vehicle is in the traveling state, the output circuit of the vehicle outputs the notification that there is a possibility of a failure to carry the second communication device, and thus a failure to carry the second communication device can be prevented.

In the vehicle wireless communication system according to the present disclosure, in the above configuration, the output circuit of the vehicle includes a display circuit, and in a case in which the first communication device is positioned in the second area and the second communication device is not positioned in the third area, the display circuit displays the notification that there is a possibility of a failure to carry the second communication device.

According to the present disclosure, since the display circuit of the vehicle displays the notification that there is a possibility of a failure to carry the second communication device, it is possible to appeal a user's visual sense about a failure to carry the second communication device.

In the vehicle wireless communication system according to the present disclosure, in the above configuration, the output circuit of the vehicle includes a speaker, and in a case in which the first communication device is positioned in the second area and the second communication device is not positioned in the third area, the speaker emits a sound to indicate the notification that there is a possibility of a failure to carry the second communication device.

According to the present disclosure, since the speaker emits the sound to indicate the notification that there is a possibility of a failure to carry the second communication device, it is possible to appeal a user's hearing about a failure to carry the second communication device.

In the vehicle wireless communication system according to the present disclosure, in the above configuration, the vehicle and the first communication device are configured to perform wireless communication in accordance with Bluetooth (registered trademark), and the vehicle and the second communication device are configured to perform wireless communication in accordance with Bluetooth (registered trademark).

According to the present disclosure, it is possible to use a plurality of communication devices at the same time in one vehicle. Power saving in communication can be achieved.

A vehicle wireless communication system includes: a control device that includes an output circuit and is mountable on a vehicle; a first communication device configured to wirelessly communicate with the control device; and a second communication device configured to wirelessly communicate with the control device, in which in a case in which the first communication device is positioned in a first area including one point located inside the vehicle, the use of the vehicle is permitted, in a case in which the first communication device is positioned in a second area including the one point located inside the vehicle and the second communication device is not positioned in a third area including the one point located inside the vehicle, the output circuit of the control device outputs a notification that there is a possibility of a failure to carry the second communication device, and in a case in which the first communication device is positioned in the second area and the second communication device enters the third area, the output circuit of the control device does not output the notification that there is a possibility of a failure to carry the second communication device.

According to the present disclosure, in a case in which the first communication device is positioned in the first area including one point (for example, a driver seat) located inside the vehicle, the control device enables the vehicle, and in a case in which the first communication device is positioned in the second area including one point located inside the vehicle and the second communication device is not positioned in the third area including one point located inside the vehicle, the control device outputs the notification that there is a possibility of a failure to carry the second communication device, and thus a failure to carry the second communication device can be prevented.

In the vehicle wireless communication system according to the present disclosure, in the above configuration, the first communication device is an electronic key, and the second communication device is an information display terminal including at least a display circuit configured to display an image.

According to the present disclosure, in a case in which the electronic key as the first communication device is positioned in the second area including one point located inside the vehicle and the information display terminal as the second communication device is not positioned in the third area including one point located inside the vehicle, the control device outputs the notification that there is a possibility of a failure to carry the information display terminal, and thus a failure to carry the information display terminal can be prevented.

In the vehicle wireless communication system according to the present disclosure, in the above configuration, the first communication device is an information display terminal including at least a display circuit configured to display an image, and the second communication device is an electronic key.

According to the present disclosure, in a case in which the information display terminal as the first communication device is positioned in the second area including one point located inside the vehicle and the electronic key as the second communication device is not positioned in the third area including one point located inside the vehicle, the control device outputs the notification that there is a possibility of a failure to carry the electronic key, and thus a failure to carry the electronic key can be prevented.

In the vehicle wireless communication system according to the present disclosure, in the above configuration, the control device is configured to store the first communication device and the second communication device in association with each other.

According to the present disclosure, in a case in which one communication device is positioned in the second area and the other communication device stored in association with the one communication device is not positioned in the third region, the control device outputs the notification that the other communication device cannot be detected, so that a failure to carry the other communication device can be prevented.

In the vehicle wireless communication system according to the present disclosure, in the above configuration, the first area and the second area are the same.

According to the present disclosure, when the first communication device is positioned in the first area including one point located inside the vehicle and the second communication device is not positioned in the third area including one point located inside the vehicle, the control device outputs the notification that there is a possibility of a failure to carry the second communication device, and thus a failure to carry the second communication device can be prevented.

In the vehicle wireless communication system according to the present disclosure, in the above configuration, the second area and the third area are the same.

According to the present disclosure, in a case in which the first communication device is positioned in the first area including one point located inside the vehicle and the second communication device is not positioned in the second area including one point located inside the vehicle, the control device outputs the notification that there is a possibility of a failure to carry the second communication device, and thus a failure to carry the second communication device can be prevented.

In the vehicle wireless communication system according to the present disclosure, in the above configuration, in a case in which the first communication device is positioned in the second area, the second communication device is not positioned in the third area and the vehicle is in a traveling state, the output circuit of the vehicle outputs the notification that there is a possibility of a failure to carry the second communication device.

According to the present disclosure, in a case in which the first communication device is positioned in the second area, the second communication device is not positioned in the third area and the vehicle is in the traveling state, the output circuit of the vehicle outputs the notification that there is a possibility of a failure to carry the second communication device, and thus a failure to carry the second communication device can be prevented.

In the vehicle wireless communication system according to the present disclosure, in the above configuration, the output circuit of the vehicle includes a display circuit, and in a case in which the first communication device is positioned in the second area and the second communication device is not positioned in enter the third area, the display circuit displays the notification that there is a possibility of a failure to carry the second communication device.

According to the present disclosure, since the display circuit of the vehicle displays the notification that there is a possibility of a failure to carry the second communication device, it is possible to appeal a user's visual sense about a failure to carry the second communication device.

In the vehicle wireless communication system according to the present disclosure, in the above configuration, the output circuit of the vehicle includes a speaker, and in a case in which the first communication device is positioned in the second area and the second communication device is not positioned in the third area, the speaker emits a sound to indicate the notification that there is a possibility of a failure to carry the second communication device.

According to the present disclosure, since the speaker emits sound to indicate the notification that there is a possibility of a failure to carry the second communication device, it is possible to appeal a user's hearing about a failure to carry the second communication device.

In the vehicle wireless communication system according to the present disclosure, in the above configuration, the vehicle and the first communication device are configured to perform wireless communication in accordance with Bluetooth (registered trademark), and the vehicle and the second communication device are configured to perform wireless communication in accordance with Bluetooth (registered trademark).

According to the present disclosure, it is possible to use a plurality of communication devices at the same time in one vehicle. Power saving in communication can be achieved.

A control device according to the present disclosure includes: an output circuit, the control device being mountable on a vehicle, the control device being configured to wirelessly communicate with a first communication device, and the control device being configured to wirelessly communicate with a second communication device, in which in a case in which the first communication device is positioned in a first area including one point located inside the vehicle, the control device controls the vehicle to permit the use of the vehicle, in a case in which the first communication device is positioned in a second area including the one point located inside the vehicle and the second communication device is not positioned in a third area including the one point located inside the vehicle, the output circuit of the control device outputs a notification that there is a possibility of a failure to carry the second communication device, and in a case in which the first communication device is positioned in the second area and the second communication device is positioned in the third area, the output circuit of the control device does not output the notification that there is a possibility of a failure to carry the second communication device.

According to the present disclosure, in a case in which the first communication device is positioned in the first area including one point located inside the vehicle, the use of the own vehicle is permitted, and thereafter, in a case in which the first communication device is positioned in the second area including one point located inside the vehicle and the second communication device is not positioned in the third area including one point located inside the vehicle, the control device outputs the notification that there is a possibility of a failure to carry the second communication device, and thus a failure to carry the second communication device can be prevented.

An information output method according to the present disclosure is usable for an output circuit of a vehicle wireless communication system, the vehicle wireless communication system including: a vehicle including an output circuit; a first communication device configured to wirelessly communicate with the vehicle; and a second communication device configured to wirelessly communicate with the vehicle, in which in a case in which the first communication device is positioned in a first area including located one point located inside the vehicle, the use of the vehicle is permitted, the information output method includes: causing the output circuit of the vehicle to output a notification that there is a possibility of a failure to carry the second communication device in a case in which the first communication device is positioned in a second area including the one point located inside the vehicle and the second communication device is not positioned in a third area including the one point located inside the vehicle; and causing the output circuit of the vehicle not to output the notification that there is a possibility of a failure to carry the second communication device.

According to the present disclosure, in a case in which the first communication device (for example, an electronic key) is positioned in the first area including one point located inside the vehicle, the use of the vehicle is permitted, and in a case in which the first communication device is positioned in the second area including one point located inside the vehicle and the second communication device (for example, a smartphone) is not positioned in the third area including one point located inside the vehicle, it is notified that there is a possibility of a failure to carry the second communication device, and thus a failure to carry the second communication device can be prevented.

According to the present disclosure, it is possible to prevent a failure to carry a pre-registered carry-on item for carry-on items carried by all persons on a vehicle.

The present application is based on Japanese Patent Application (Japanese Patent Application No. 2019-045809) filed on Mar. 13, 2019, and the contents of which are incorporated herein by reference.

The vehicle wireless communication system according to the present disclosure is useful for a vehicle such as a motorcycle and an automobile.

The invention claimed is:

1. A control method for a vehicle, the vehicle comprising an output circuit, configured to wirelessly communicate with a first communication device, and configured to wirelessly communicate with a second communication device, the control method comprises:
   permitting use of the vehicle, when the first communication device is positioned in a first region comprising one point located inside the vehicle;
   outputting by the output circuit, a notification that there is a possibility of failure to carry the second communication device, when the first communication device is positioned in a second region comprising the one point located inside the vehicle and the second communication device is not positioned in a third region comprising the one point located inside the vehicle; and
   refraining from outputting by the output circuit, the notification that there is a possibility of a failure to carry the second communication device, when the first communication device is positioned in the second region and the second communication device is positioned in the third region.

2. The control method for the vehicle according to claim 1,
   wherein the first communication device is an electronic key, and
   wherein the second communication device is an information display terminal comprising at least a display circuit configured to display an image.

3. The control method for the vehicle according to claim 1,
   wherein the first communication device is an information display terminal comprising at least a display circuit configured to display an image, and
   wherein the second communication device is an electronic key.

4. The control method for the vehicle according to claim 1, wherein the first communication device is recorded in the vehicle, in association with the second communication device.

5. The control method for the vehicle according to claim 1, wherein the first region equals to the second region.

6. The control method for the vehicle according to claim 1, wherein the second region equals to the third region.

7. The control method for the vehicle according to claim 1, wherein outputting by the output circuit, the notification that there is a possibility of failure to carry the second communication device, when the first communication device is positioned in the second region, and the second communication device is not positioned in the third region, and the vehicle is in a traveling state.

8. The control method for the vehicle according to claim 1, wherein the output circuit of the vehicle comprises a display circuit.

9. The control method for the vehicle according to claim 1, wherein the output circuit of the vehicle comprises a speaker.

10. The control method for the vehicle according to claim 1,
    wherein the vehicle and the first communication device are configured to perform wireless communication in accordance with Bluetooth, and wherein the vehicle and the second communication device are configured to perform wireless communication in accordance with Bluetooth.

11. A control method for a control device mounted in a vehicle, the control device coupled with an output circuit, configured to wirelessly communicate with a first communication device, and configured to wirelessly communicate with a second communication device, the control method comprises:
   permitting a use of the vehicle, when the first communication device is positioned in a first region comprising one point located inside the vehicle;
   outputting by the output circuit, a notification that there is a possibility of failure to carry the second communication device, when the first communication device is positioned in a second region comprising the one point located inside the vehicle and the second communication device is not positioned in a third region comprising the one point located inside the vehicle; and
   refraining from outputting by the output circuit, the notification that there is a possibility of a failure to carry the second communication device, when the first communication device is positioned in the second region and the second communication device is positioned in the third region.

12. The control method for the control device according to claim 11,
   wherein the first communication device is an electronic key, and
   wherein the second communication device is an information display terminal comprising at least a display circuit configured to display an image.

13. The control method for the control device according to claim 11,
   wherein the first communication device is an information display terminal comprising at least a display circuit configured to display an image, and
   wherein the second communication device is an electronic key.

14. The control method for the control device according to claim 11, wherein the first communication device is recorded in the vehicle, in association with the second communication device.

15. The control method for the control device according to claim 11, wherein the first region equals to the second region.

16. The control method for the control device according to claim 11, wherein the second region equals to the third region.

17. The control method for the control device according to claim 11, wherein outputting by the output circuit, the notification that there is a possibility of failure to carry the second communication device, when the first communication device is positioned in the second region, and the second communication device is not positioned in the third region, and the vehicle is in a traveling state.

18. The control method for the control device according to claim 11, wherein the output circuit of the vehicle comprises a display circuit.

19. The control method for the control device according to claim 11, wherein the output circuit of the vehicle comprises a speaker.

20. The control method for the control device according to claim 11,
   wherein the vehicle and the first communication device are configured to perform wireless communication in accordance with Bluetooth, and
   wherein the vehicle and the second communication device are configured to perform wireless communication in accordance with Bluetooth.

* * * * *